US012693638B2

(12) United States Patent
Wu et al.

(10) Patent No.: US 12,693,638 B2
(45) Date of Patent: Jul. 28, 2026

(54) RECOMMENDATION SYSTEM FOR ADVANCED PROCESS CONTROL LIMITS USING INSTANCE-BASED LEARNING

(71) Applicant: Honeywell International Inc., Charlotte, NC (US)

(72) Inventors: Yanling Wu, Katy, TX (US); Andrew John Trenchard, Romsey (GB)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 282 days.

(21) Appl. No.: 18/321,905

(22) Filed: May 23, 2023

(65) Prior Publication Data

US 2023/0408989 A1      Dec. 21, 2023

Related U.S. Application Data

(60) Provisional application No. 63/354,046, filed on Jun. 21, 2022.

(51) Int. Cl.
| | |
|---|---|
| G05B 13/04 | (2006.01) |
| G05B 13/02 | (2006.01) |
| G06N 5/022 | (2023.01) |

(52) U.S. Cl.
CPC ....... G05B 13/041 (2013.01); G05B 13/0265 (2013.01); G06N 5/022 (2013.01)

(58) Field of Classification Search
CPC ... G05B 13/041; G05B 13/0265; G06N 5/022
USPC ......................................................... 700/44
See application file for complete search history.

(56) References Cited

U.S. PATENT DOCUMENTS

| | | | |
|---|---|---|---|
| 10,387,392 B2 | 8/2019 | Bliss et al. | |
| 10,949,813 B2 | 3/2021 | John et al. | |
| 10,963,802 B1 * | 3/2021 | Gardner ................. | G06N 20/20 |
| 12,472,391 B2 | 11/2025 | Awiszus et al. | |
| 2009/0119657 A1 | 5/2009 | Link, II | |

(Continued)

FOREIGN PATENT DOCUMENTS

| | | |
|---|---|---|
| CN | 107436594 A | 12/2017 |
| CN | 112292186 A | 1/2021 |

(Continued)

OTHER PUBLICATIONS

European search report Mailed on Nov. 22, 2023 for EP Application No. 23177897, 8 page(s).
Communication about intention to grant a European patent Mailed on Mar. 21, 2025 for EP Application No. 23177897, 6 page(s).
SA Office Action Mailed on Jul. 5, 2024 for SA Application No. 123447301, 13 page(s).

(Continued)

*Primary Examiner* — Jigneshkumar C Patel
(74) *Attorney, Agent, or Firm* — Alston & Bird LLP

(57) ABSTRACT

Various embodiments described herein relate to advanced process control for assets and/or processes using instance-based learning. In this regard, an event indicator related to a change event associated with operation of an asset is received. In response to the event indicator, one or more insights for one or more real-time settings for the asset are determined based at least in part on a comparison between a current operating condition digital signature for the asset and historical operating condition digital signature for the asset. Additionally, the one or more real-time settings for the asset are adjusted based on the one or more insights to provide one or more adjusted settings for the asset.

18 Claims, 12 Drawing Sheets

(56) References Cited

U.S. PATENT DOCUMENTS

| | | | |
|---|---|---|---|
| 2012/0041575 A1* | 2/2012 | Maeda | G05B 23/024 |
| | | | 700/79 |
| 2016/0078695 A1 | 3/2016 | Mcclintic et al. | |
| 2017/0323239 A1 | 11/2017 | Johnson et al. | |
| 2020/0058041 A1* | 2/2020 | Bharwani | G06Q 30/0207 |
| 2020/0125470 A1 | 4/2020 | Cui et al. | |
| 2020/0408194 A1* | 12/2020 | Zen | F03D 7/045 |
| 2021/0107545 A1 | 4/2021 | Howard et al. | |
| 2021/0173358 A1 | 6/2021 | Subbloie et al. | |

FOREIGN PATENT DOCUMENTS

| | | |
|---|---|---|
| EP | 3483799 A1 | 5/2019 |
| WO | 2022/120360 A1 | 6/2022 |

OTHER PUBLICATIONS

Decision to grant a European patent Mailed on Jul. 31, 2025 for EP Application No. 23177897, 2 page(s).

AE Office Action, including Search Report Mailed on Dec. 30, 2025 for AE Application No. P6001535/2023, 8 page(s).

CN Office Action, including Search Report Mailed on Apr. 2, 2026 for CN Application No. 202310727237, 12 page(s).

Cui Yong: Cybersecurity protection strategies for industrial control systems under the new "Internet+", paradigm, No. 5, Oct. 15, 2016, pp. 15-19.

English Translation of CN Office Action dated Apr. 2, 2026 for CN Application No. 202310727237, 13 page(s).

* cited by examiner

COMPUTING DEVICE 402

VISUAL DISPLAY 504

SPEAKER(S) 506

CAMERA(S) 508

MICROPHONE(S) 510

GLOBAL POSITIONING SYSTEM (GPS) DEVICE 512

GYROSCOPE 514

WIRELESS COMMUNICATION DEVICE(S) 516

POWER SUPPLY 518

FIG. 7

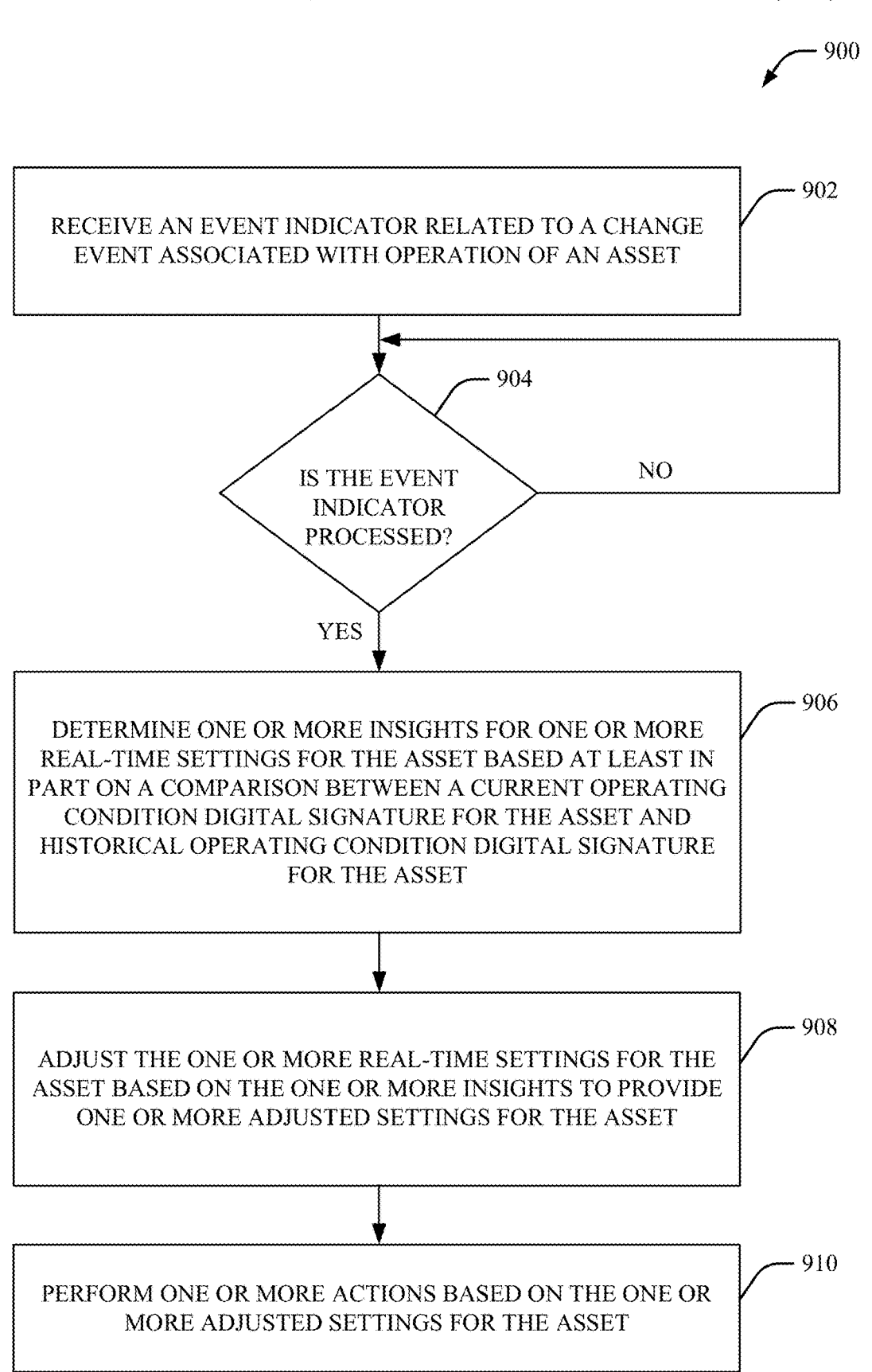

— 900

RECEIVE AN EVENT INDICATOR RELATED TO A CHANGE EVENT ASSOCIATED WITH OPERATION OF AN ASSET

— 902

IS THE EVENT INDICATOR PROCESSED?

— 904

NO

YES

DETERMINE ONE OR MORE INSIGHTS FOR ONE OR MORE REAL-TIME SETTINGS FOR THE ASSET BASED AT LEAST IN PART ON A COMPARISON BETWEEN A CURRENT OPERATING CONDITION DIGITAL SIGNATURE FOR THE ASSET AND HISTORICAL OPERATING CONDITION DIGITAL SIGNATURE FOR THE ASSET

— 906

ADJUST THE ONE OR MORE REAL-TIME SETTINGS FOR THE ASSET BASED ON THE ONE OR MORE INSIGHTS TO PROVIDE ONE OR MORE ADJUSTED SETTINGS FOR THE ASSET

— 908

PERFORM ONE OR MORE ACTIONS BASED ON THE ONE OR MORE ADJUSTED SETTINGS FOR THE ASSET

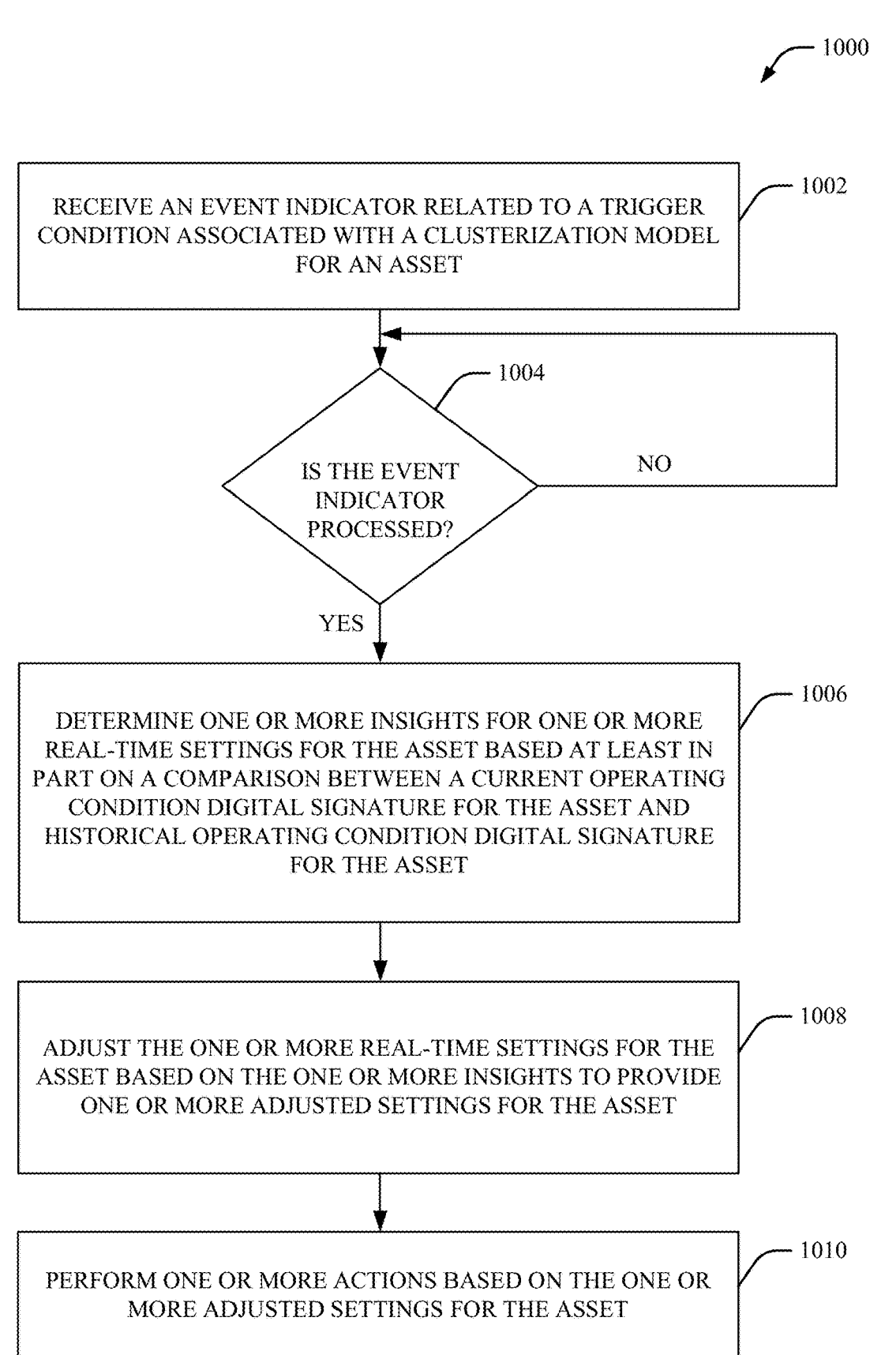

1000

1002
RECEIVE AN EVENT INDICATOR RELATED TO A TRIGGER CONDITION ASSOCIATED WITH A CLUSTERIZATION MODEL FOR AN ASSET

1004
IS THE EVENT INDICATOR PROCESSED?

NO

YES

1006
DETERMINE ONE OR MORE INSIGHTS FOR ONE OR MORE REAL-TIME SETTINGS FOR THE ASSET BASED AT LEAST IN PART ON A COMPARISON BETWEEN A CURRENT OPERATING CONDITION DIGITAL SIGNATURE FOR THE ASSET AND HISTORICAL OPERATING CONDITION DIGITAL SIGNATURE FOR THE ASSET

1008
ADJUST THE ONE OR MORE REAL-TIME SETTINGS FOR THE ASSET BASED ON THE ONE OR MORE INSIGHTS TO PROVIDE ONE OR MORE ADJUSTED SETTINGS FOR THE ASSET

1010
PERFORM ONE OR MORE ACTIONS BASED ON THE ONE OR MORE ADJUSTED SETTINGS FOR THE ASSET

FIG. 10

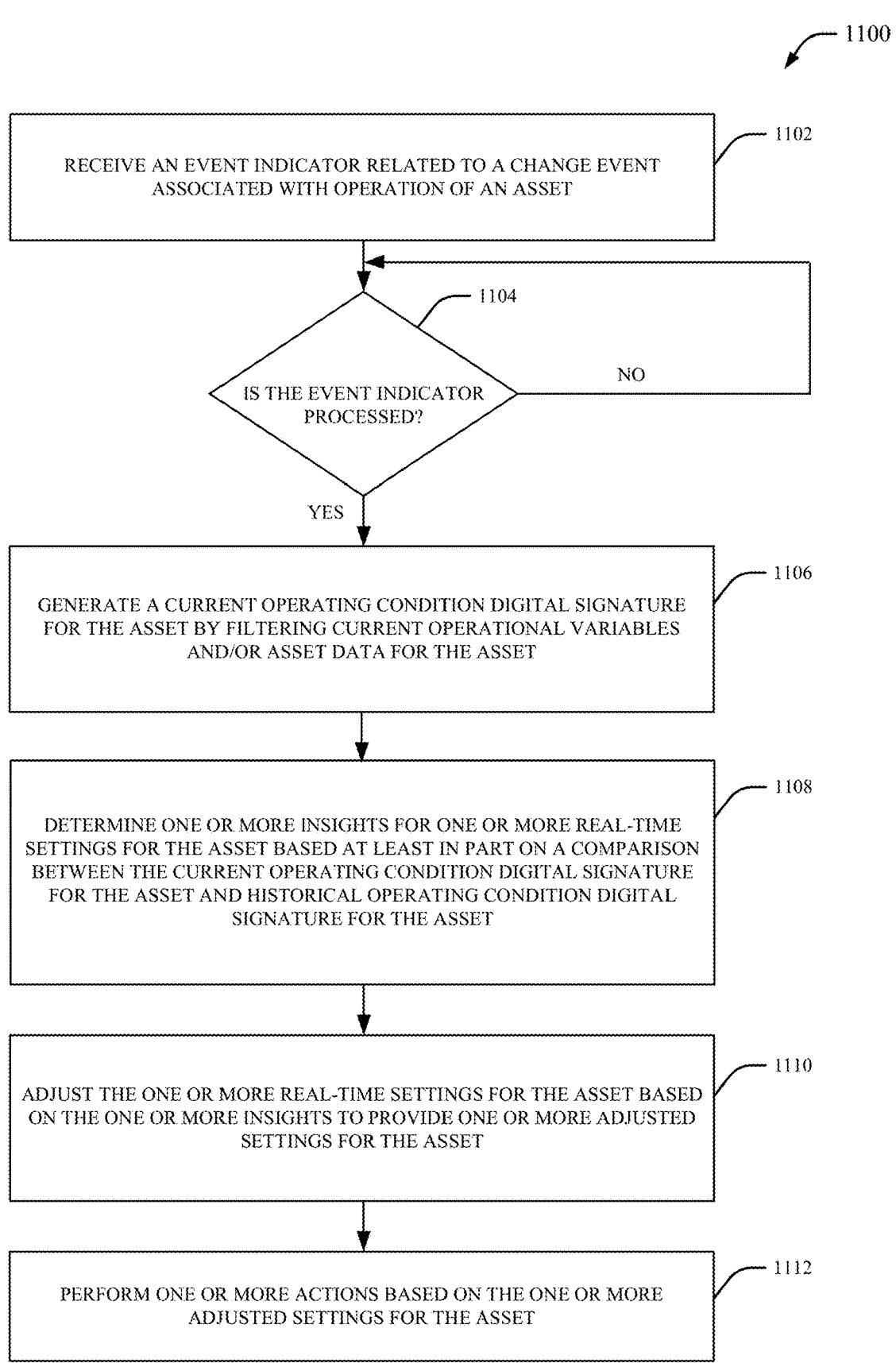

1100

1102
RECEIVE AN EVENT INDICATOR RELATED TO A CHANGE EVENT ASSOCIATED WITH OPERATION OF AN ASSET

1104
IS THE EVENT INDICATOR PROCESSED?

NO

YES

1106
GENERATE A CURRENT OPERATING CONDITION DIGITAL SIGNATURE FOR THE ASSET BY FILTERING CURRENT OPERATIONAL VARIABLES AND/OR ASSET DATA FOR THE ASSET

1108
DETERMINE ONE OR MORE INSIGHTS FOR ONE OR MORE REAL-TIME SETTINGS FOR THE ASSET BASED AT LEAST IN PART ON A COMPARISON BETWEEN THE CURRENT OPERATING CONDITION DIGITAL SIGNATURE FOR THE ASSET AND HISTORICAL OPERATING CONDITION DIGITAL SIGNATURE FOR THE ASSET

1110
ADJUST THE ONE OR MORE REAL-TIME SETTINGS FOR THE ASSET BASED ON THE ONE OR MORE INSIGHTS TO PROVIDE ONE OR MORE ADJUSTED SETTINGS FOR THE ASSET

1112
PERFORM ONE OR MORE ACTIONS BASED ON THE ONE OR MORE ADJUSTED SETTINGS FOR THE ASSET

FIG. 11

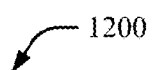
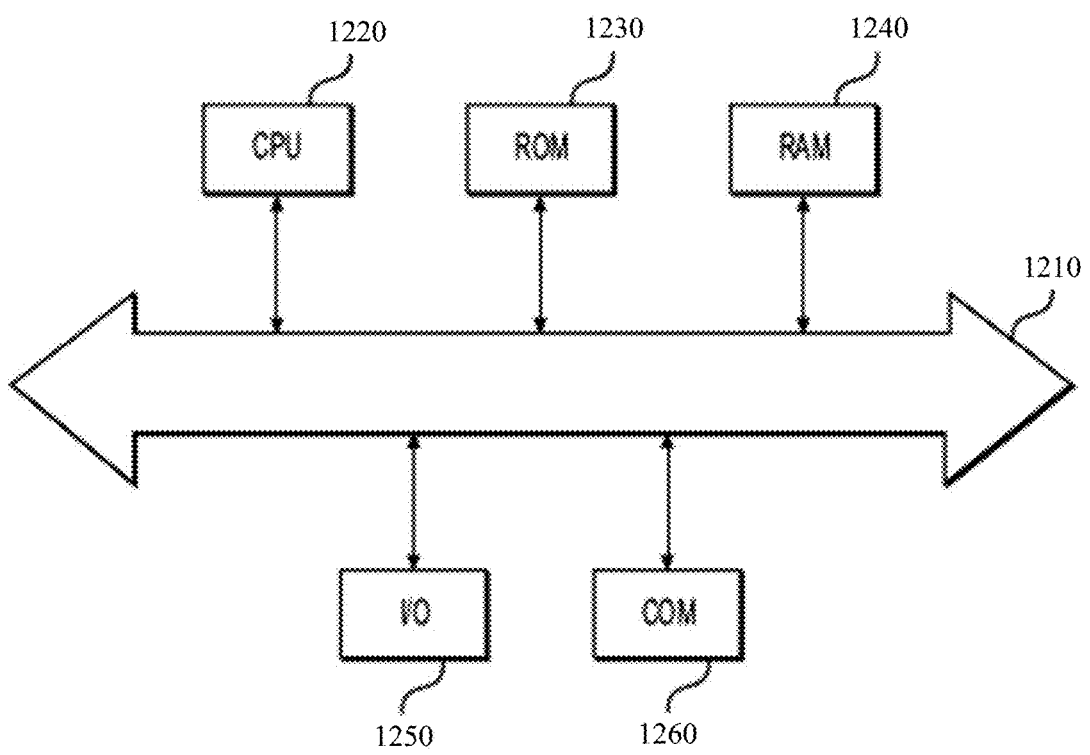
FIG. 12

RECOMMENDATION SYSTEM FOR ADVANCED PROCESS CONTROL LIMITS USING INSTANCE-BASED LEARNING

CROSS REFERENCE TO RELATED APPLICATIONS

This application claims the benefit of U.S. Provisional Patent Application No. 63/354,046, titled "RECOMMENDATION SYSTEM FOR ADVANCED PROCESS CONTROL LIMITS USING INSTANCE-BASED LEARNING," and filed on Jun. 21, 2022, the entirety of which is hereby incorporated by reference.

TECHNICAL FIELD

The present disclosure relates generally to process control systems, and more particularly to process control systems for process optimization and/or asset optimization.

BACKGROUND

Industrial facilities are often managed using industrial process control systems. Industrial processes for industrial assets such as, for example, oil and gas processes, are generally controlled within fixed high and low limits of operation in accordance with fixed equipment specifications and/or fixed operating procedures. However, some of these operational limits may vary with operating mode and hence are dynamic in nature. Therefore, if fixed control limits are used for industrial assets and/or processes, the industrial assets and/or processes may be operated in an inefficient manner.

SUMMARY

The details of some embodiments of the subject matter described in this specification are set forth in the accompanying drawings and the description below. Other features, aspects, and advantages of the subject matter will become apparent from the description, the drawings, and the claims.

In an embodiment, a system comprises one or more processors, a memory, and one or more programs stored in the memory. The one or more programs comprise instructions configured to receive an event indicator related to a change event associated with operation of an asset. In one or more embodiments, in response to the event indicator associated with the asset, the one or more programs additionally or alternatively comprise instructions configured to determine one or more insights for one or more real-time settings for the asset based at least in part on a comparison between a current operating condition digital signature for the asset and historical operating condition digital signature for the asset. In one or more embodiments, in response to the event indicator associated with the asset, the one or more programs additionally or alternatively comprise instructions configured to adjust the one or more real-time settings for the asset based on the one or more insights to provide one or more adjusted settings for the asset. In one or more embodiments, in response to the event indicator associated with the asset, the one or more programs additionally or alternatively comprise instructions configured to perform one or more actions based on the one or more adjusted settings for the asset.

In another embodiment, a method comprises, at a device with one or more processors and a memory, receiving an event indicator related to a change event associated with operation of an asset. In one or more embodiments, in response to the event indicator associated with the asset, the method additionally or alternatively comprises determining one or more insights for one or more real-time settings for the asset based at least in part on a comparison between a current operating condition digital signature for the asset and historical operating condition digital signature for the asset, adjusting the one or more real-time settings for the asset based on the one or more insights to provide one or more adjusted settings for the asset, and/or performing one or more actions based on the one or more adjusted settings for the asset.

In yet another embodiment, a computer program product comprises at least one computer-readable storage medium having program instructions embodied thereon. The program instructions are executable by a processor to cause the processor to receive an event indicator related to a change event associated with operation of an asset. In one or more embodiments, in response to the event indicator associated with the asset, the program instructions are additionally or alternatively executable by the processor to cause the processor to determine one or more insights for one or more real-time settings for the asset based at least in part on a comparison between a current operating condition digital signature for the asset and historical operating condition digital signature for the asset. In one or more embodiments, in response to the event indicator associated with the asset, the program instructions are additionally or alternatively executable by the processor to cause the processor to adjust the one or more real-time settings for the asset based on the one or more insights to provide one or more adjusted settings for the asset. In one or more embodiments, in response to the event indicator associated with the asset, the program instructions are additionally or alternatively executable by the processor to perform one or more actions based on the one or more adjusted settings for the asset.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 7 illustrates an exemplary electronic interface, in accordance with one or more embodiments described herein;

FIG. 9 illustrates a flow diagram for advanced process control for assets and/or processes using instance-based learning, in accordance with one or more embodiments described herein;

FIG. 10 illustrates another flow diagram for advanced process control for assets and/or processes using instance-based learning, in accordance with one or more embodiments described herein;

FIG. 11 illustrates another flow diagram for advanced process control for assets and/or processes using instance-based learning, in accordance with one or more embodiments described herein; and FIG. 12 illustrates a functional block diagram of a computer that may be configured to execute techniques described in accordance with one or more embodiments described herein.

DETAILED DESCRIPTION

Figure 1:
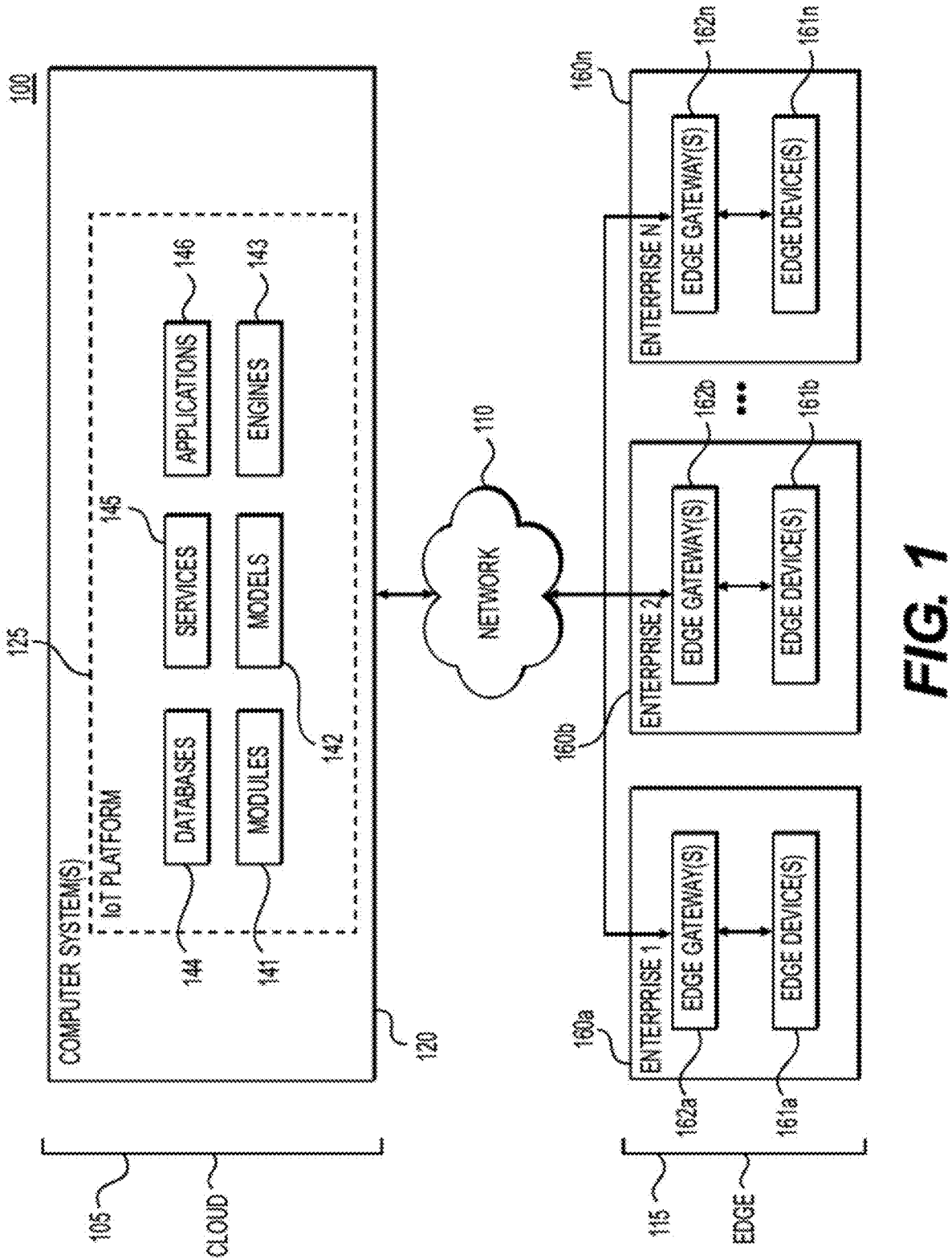
FIG. 1 illustrates an exemplary networked computing system environment, in accordance with one or more embodiments described herein.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments. The term "or" is used herein in both the alternative and conjunctive sense, unless otherwise indicated. The terms "illustrative," "example," and "exemplary" are used to be examples with no indication of quality level. Like numbers refer to like elements throughout.

The phrases "in an embodiment," "in one embodiment," "according to one embodiment," and the like generally mean that the particular feature, structure, or characteristic following the phrase can be included in at least one embodiment of the present disclosure, and can be included in more than one embodiment of the present disclosure (importantly, such phrases do not necessarily refer to the same embodiment).

The word "exemplary" is used herein to mean "serving as an example, instance, or illustration." Any implementation described herein as "exemplary" is not necessarily to be construed as preferred or advantageous over other implementations.

If the specification states a component or feature "can," "may," "could," "should," "would," "preferably," "possibly," "typically," "optionally," "for example," "often," or "might" (or other such language) be included or have a characteristic, that particular component or feature is not required to be included or to have the characteristic. Such component or feature can be optionally included in some embodiments, or it can be excluded.

In one or more embodiments, the present disclosure provides for an "Internet-of-Things" or "IoT" platform for industrial process control and/or industrial process optimization that uses real-time accurate models and/or real-time control for sustained peak performance of an enterprise and/or an enterprise process. The IoT platform is an extensible platform that is portable for deployment in any cloud or data center environment for providing an enterprise-wide, top to bottom control of processes and/or assets. Further, the IoT platform of the present disclosure supports end-to-end capability to execute models against process data and/or to translate the output into actionable insights and/or real-time control, as detailed in the following description.

Industrial facilities are often managed using industrial process control systems. Industrial processes for industrial assets such as, for example, oil and gas processes, are generally controlled within fixed high and low limits of operation in accordance with fixed equipment specifications and/or fixed operating procedures. For example, industrial processes for industrial assets generally employ a static operating mode for a period of time and for that period of time the control limits for the process variables are not adjusted during real-time operation. However, industrial assets generally operate in a dynamic manner, changing between different modes of operation from time to time (e.g., depending on feedstock quality or required product specifications). If the fixed control limits of operation for industrial assets and/or processes are inaccurately configured as the plant mode changes, the industrial assets and/or processes may be operated in an inefficient manner. Moreover, certain types of industrial processes can be concatenated to one or more other industrial processes in an industrial facility. As such, certain types of industrial processes can disrupt one or more other industrial processes related to an industrial facility, causing the industrial facility and/or one or more industrial assets in the industrial facility to be operated in an inefficient and/or undesirable manner. In certain industrial systems, data-driven models can be employed to represent industrial processes. However, non-linearity of data and/or limited training data and ranges often result in data-driven models with incorrect model structure for industrial processes and/or assets. Additionally, data-driven models can lead to inaccurate state description, inaccurate interpolation, and/or infeasible recommendations for industrial processes and/or assets.

Thus, to address these and/or other issues, the present disclosure provides for advanced process control for assets and/or processes using instance-based learning. The instance-based learning can be configured for instance-based optimization for assets and/or processes. In various embodiments, the assets and/or processes can be industrial assets and/or industrial processes. However, it is to be appreciated that the assets and/or processes can additionally or alternatively include other types of assets and/or processes. The instance-based learning can be a machine learning technique associated with memory-based learning that compares problem instances of data with cleansed instances of historical data stored in memory. Additionally, the instance-based learning can employ stored and/or cleansed historical data as model inputs for providing predictions and/or optimization. In various embodiments, a recommendation system for advanced process control limits is provided using instance-based learning. Additionally, through intelligent mining of preprocessed and/or cleansed historical operating data, optimal recommendation of advanced process control limits can be provided to current operation of an asset and/or process to achieve, for example, mutually exclusive operational objectives. The operational objectives can include, for example, improved throughputs, improved product purity, less energy consumption, and/or one or more other operational improvements with respect to an asset and/or process. Additionally, the intelligent mining of preprocessed and/or cleansed historical operating data can provide operational objectives that are closer to current operation of an asset and/or process. In this regard, in various embodiments, similarity between cleansed historical operating conditions (e.g., a set of variables) and current operating conditions (e.g., another set of variables) can be determined and/or recommendations can be provided to facilitate satisfaction of the operational objectives. In various embodiments, the preprocessed and/or cleansed historical operating data is employed as a model for predictions and/or recommendations related to the advanced process control limits.

In various embodiments, the instance-based learning is integrated into a supervisory-level optimization system for assets and/or processes based on machine learning models and optimization techniques that provide insights and/or recommendations to operate assets, processes and/or underlying advanced process control systems within optimal operating ranges. In various embodiments, optimization of assets and/or processes can be provided based on instance-based learning with respect to historical records for assets and/or processes. For example, optimization of assets and/or processes can be provided based on direct mining of historical data and/or analysis of cleansed historical data.

In various embodiments, adaptive recommendations can be provided based on direct mining of historical data and/or analysis of cleansed historical data. In various embodiments, the adaptive recommendations can provide optimized operating conditions for assets and/or processes based on cleansed normal historical data (e.g., based on direct and intelligent analysis of cleansed normal historical data). In various embodiments, the instance-based learning with respect to the historical records for assets and/or processes can be provided without employing predictive modeling with respect to the assets and/or processes. Accordingly, the instance-based learning for advanced process control can be provided without performing model identification, repeated model retraining, and/or repeated model hyperparameter tuning.

In various embodiments, the advanced process control using instance-based learning is integrated into an overall industrial optimization scheme for one or more industrial processes. For example, in various embodiments, the advanced process control using instance-based learning is connected to an overall industrial optimization scheme to provide optimized operating settings for assets. Accordingly, the present disclosure provides for optimizing assets and/or industrial processes without relying on fixed operating settings. Accordingly, capacity of a monitored industrial asset can be utilized in real-time by one or more industrial processes. Closed-loop optimization with real-time calculation of optimization limits for assets and/or industrial processes can also be provided. Moreover, plantwide optimization including detailed asset monitoring information can be provided for asset optimization and/or to improved asset capabilities.

In various embodiments, the advanced process control using instance-based learning provides one or more optimal recipes (e.g., optimal batch blending recipes, optimal batch-blending plantwide recipes, etc.) for an industrial process. In certain embodiments, an industrial process includes batch product blending for an oil refinery. In certain embodiments, the industrial process includes filter washing processes in a chemical refinery (e.g., an alumina refinery, etc.) or a lubricant plant. However, it is to be appreciated that, in certain embodiments, the industrial process is a different type of industrial process. It is also to be appreciated that the techniques disclosed herein can also be employed for optimization other types of assets and/or processes.

Accordingly, improved throughput and/or recovery of assets and/or processes in response to defined events can be provided. Additionally, by employing the instance-based learning, a number of updates to one or more databases and/or memory employed for modeling of assets and/or processes can be provided. Moreover, the instance-based learning with respect to assets and/or processes can be provided in real-time for further enhancement of performance for the assets and/or processes.

In various embodiments, by employing one or more techniques disclosed herein, disruptions with respect to a process can be minimized or eliminated. Additionally, by employing one or more techniques disclosed herein, smooth plantwide control and/or optimization solutions related to the industrial operations can be provided. Moreover, by employing one or more techniques disclosed herein, process performance and/or process efficiency is optimized. In various embodiments, an amount of time and/or an amount of processing related to an process is reduced. Additionally, in one or more embodiments, performance of a processing system (e.g., a control system) associated with an process is improved by employing one or more techniques disclosed herein. For example, in one or more embodiments, a number of computing resources, a number of a storage requirements, and/or number of errors associated with a processing system (e.g., a control system) for an process is reduced by employing one or more techniques disclosed herein.

FIG. 1 illustrates an exemplary networked computing system environment 100, according to the present disclosure. As shown in FIG. 1, networked computing system environment 100 is organized into a plurality of layers including a cloud 105, a network 110, and an edge 115. In one or more embodiments, the cloud 105 is a cloud layer, the network 110 is a network layer, and the edge 115 is an edge layer. As detailed further below, components of the edge 115 are in communication with components of the cloud 105 via network 110.

In various embodiments, network 110 is any suitable network or combination of networks and supports any appropriate protocol suitable for communication of data to and from components of the cloud 105 and between various other components in the networked computing system environment 100 (e.g., components of the edge 115). According to various embodiments, network 110 includes a public network (e.g., the Internet), a private network (e.g., a network within an organization), or a combination of public and/or private networks. According to various embodiments, network 110 is configured to provide communication between various components depicted in FIG. 1. According to various embodiments, network 110 comprises one or more networks that connect devices and/or components in the network layout to allow communication between the devices and/or components. For example, in one or more embodiments, the network 110 is implemented as the Internet, a wireless network, a wired network (e.g., Ethernet), a local area network (LAN), a Wide Area Network (WANs), Bluetooth, Near Field Communication (NFC), or any other type of network that provides communications between one or more components of the network layout. In some embodiments, network 110 is implemented using cellular networks, satellite, licensed radio, or a combination of cellular, satellite, licensed radio, and/or unlicensed radio networks.

Components of the cloud 105 include one or more computer systems 120 that form a so-called "Internet-of-Things" or "IoT" platform 125. It should be appreciated that "IoT platform" is an optional term describing a platform connecting any type of Internet-connected device, and should not be construed as limiting on the types of computing systems useable within IoT platform 125. In particular, in various embodiments, computer systems 120 includes any type or quantity of one or more processors and one or more data storage devices comprising memory for storing and executing applications or software modules of networked computing system environment 100. In one embodiment, the processors and data storage devices are embodied in server-class hardware, such as enterprise-level servers. For example, in an embodiment, the processors and data storage devices comprises any type or combination of application servers, communication servers, web servers, super-computing servers, database servers, file servers, mail servers, proxy servers, and/virtual servers. Further, the one or more processors are configured to access the memory and execute processor-readable instructions, which when executed by the processors configures the processors to perform a plurality of functions of the networked computing system environment 100.

Computer systems 120 further include one or more software components of the IoT platform 125. For example, in one or more embodiments, the software components of computer systems 120 include one or more software modules to communicate with user devices and/or other computing devices through network 110. For example, in one or more embodiments, the software components include one or more modules 141, models 142, engines 143, databases 144, services 145, and/or applications 146, which may be stored in/by the computer systems 120 (e.g., stored on the memory), as detailed with respect to FIG. 2 below. According to various embodiments, the one or more processors are configured to utilize the one or more modules 141, models 142, engines 143, databases 144, services 145, and/or applications 146 when performing various methods described in this disclosure.

Accordingly, in one or more embodiments, computer systems 120 execute a cloud computing platform (e.g., IoT platform 125) with scalable resources for computation and/or data storage, and may run one or more applications on the cloud computing platform to perform various computer-implemented methods described in this disclosure. In some embodiments, some of the modules 141, models 142, engines 143, databases 144, services 145, and/or applications 146 are combined to form fewer modules, models, engines, databases, services, and/or applications. In some embodiments, some of the modules 141, models 142, engines 143, databases 144, services 145, and/or applications 146 are separated into separate, more numerous modules, models, engines, databases, services, and/or applications. In some embodiments, some of the modules 141, models 142, engines 143, databases 144, services 145, and/or applications 146 are removed while others are added.

The computer systems 120 are configured to receive data from other components (e.g., components of the edge 115) of networked computing system environment 100 via network 110. Computer systems 120 are further configured to utilize the received data to produce a result. According to various embodiments, information indicating the result is transmitted to users via user computing devices over network 110. In some embodiments, the computer systems 120 is a server system that provides one or more services including providing the information indicating the received data and/or the result(s) to the users. According to various embodiments, computer systems 120 are part of an entity which include any type of company, organization, or institution that implements one or more IoT services. In some examples, the entity is an IoT platform provider.

Components of the edge 115 include one or more enterprises 160a-160n each including one or more edge devices 161a-161n and one or more edge gateways 162a-162n. For example, a first enterprise 160a includes first edge devices 161a and first edge gateways 162a, a second enterprise 160b includes second edge devices 161b and second edge gateways 162b, and an nth enterprise 160n includes nth edge devices 161n and nth edge gateways 162n. As used herein, enterprises 160a-160n represent any type of entity, facility, or vehicle, such as, for example, processing facilities, industrial plants, oil and gas facilities (e.g., oil refineries), chemical processing facilities (e.g., metal refinery, alumina refinery, etc.), lubricant industrial plants, manufacturing plants, buildings, warehouses, real estate facilities, laboratories, companies, divisions, aircrafts, spacecrafts, automobiles, ships, boats, military vehicles, or any other type of entity, facility, and/or vehicle that includes any number of local devices.

Figure 2:
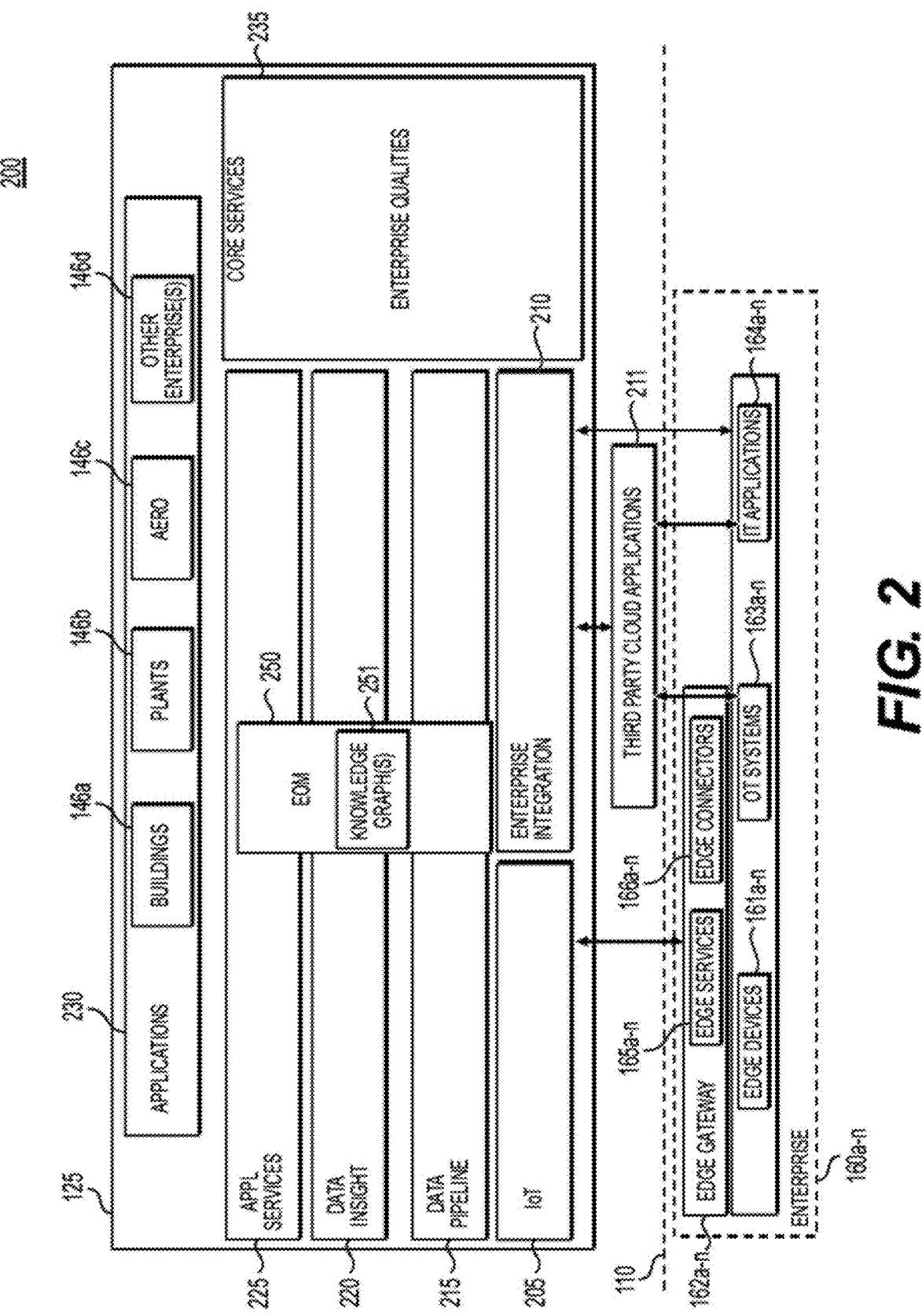
FIG. 2 illustrates a schematic block diagram of a framework of an IoT platform of the networked computing system, in accordance with one or more embodiments described herein.

According to various embodiments, the edge devices 161a-161n represent any of a variety of different types of devices that may be found within the enterprises 160a-160n. Edge devices 161a-161n are any type of device configured to access network 110, or be accessed by other devices through network 110, such as via an edge gateway 162a-162n. According to various embodiments, edge devices 161a-161n are "IoT devices" which include any type of network-connected (e.g., Internet-connected) device. For example, in one or more embodiments, the edge devices 161a-161n include sensors, units, storage tanks, air handler units, fans, actuators, valves, pumps, ducts, processors, computers, vehicle components, cameras, displays, doors, windows, security components, HVAC components, factory equipment, refinery equipment, and/or any other devices that are connected to the network 110 for collecting, sending, and/or receiving information. Each edge device 161a-161n includes, or is otherwise in communication with, one or more controllers for selectively controlling a respective edge device 161a-161n and/or for sending/receiving information between the edge devices 161a-161n and the cloud 105 via network 110. With reference to FIG. 2, in one or more embodiments, the edge 115 include operational technology (OT) systems 163a-163n and information technology (IT) applications 164a-164n of each enterprise 161a-161n. The OT systems 163a-163n include hardware and software for detecting and/or causing a change, through the direct monitoring and/or control of industrial equipment (e.g., edge devices 161a-161n), assets, processes, and/or events. The IT applications 164a-164n includes network, storage, and computing resources for the generation, management, storage, and delivery of data throughout and between organizations.

The edge gateways 162a-162n include devices for facilitating communication between the edge devices 161a-161n and the cloud 105 via network 110. For example, the edge gateways 162a-162n include one or more communication interfaces for communicating with the edge devices 161a-161n and for communicating with the cloud 105 via network 110. According to various embodiments, the communication interfaces of the edge gateways 162a-162n include one or more cellular radios, Bluetooth, WiFi, near-field communication radios, Ethernet, or other appropriate communication devices for transmitting and receiving information. According to various embodiments, multiple communication interfaces are included in each gateway 162a-162n for providing multiple forms of communication between the edge devices 161a-161n, the gateways 162a-162n, and the cloud 105 via network 110. For example, in one or more embodiments, communication are achieved with the edge devices 161a-161n and/or the network 110 through wireless communication (e.g., WiFi, radio communication, etc.) and/or a wired data connection (e.g., a universal serial bus, an onboard diagnostic system, etc.) or other communication modes, such as a local area network (LAN), wide area network (WAN) such as the Internet, a telecommunications network, a data network, or any other type of network.

According to various embodiments, the edge gateways 162a-162n also include a processor and memory for storing and executing program instructions to facilitate data processing. For example, in one or more embodiments, the edge gateways 162a-162n are configured to receive data from the edge devices 161a-161n and process the data prior to sending the data to the cloud 105. Accordingly, in one or more embodiments, the edge gateways 162a-162n include one or more software modules or components for providing data processing services and/or other services or methods of the present disclosure. With reference to FIG. 2, each edge gateway 162a-162n includes edge services 165a-165n and edge connectors 166a-166n. According to various embodiments, the edge services 165a-165n include hardware and software components for processing the data from the edge devices 161a-161n. According to various embodiments, the edge connectors 166a-166n include hardware and software components for facilitating communication between the edge gateway 162a-162n and the cloud 105 via network 110, as detailed above. In some cases, any of edge devices 161a-n, edge connectors 166a-n, and edge gateways 162a-n have their functionality combined, omitted, or separated into any combination of devices. In other words, an edge device and its connector and gateway need not necessarily be discrete devices.

FIG. 2 illustrates a schematic block diagram of framework 200 of the IoT platform 125, according to the present disclosure. The IoT platform 125 of the present disclosure is a platform for plantwide optimization that uses real-time accurate models and/or real-time data to deliver intelligent actionable recommendations and/or real-time control for sustained peak performance of the enterprise 160a-160n. The IoT platform 125 is an extensible platform that is portable for deployment in any cloud or data center environment for providing an enterprise-wide, top to bottom view, displaying the status of processes, assets, people, and safety. Further, the IoT platform 125 supports end-to-end capability to execute digital twins against process data and to translate the output into actionable insights, using the framework 200, detailed further below.

As shown in FIG. 2, the framework 200 of the IoT platform 125 comprises a number of layers including, for example, an IoT layer 205, an enterprise integration layer 210, a data pipeline layer 215, a data insight layer 220, an application services layer 225, and an applications layer 230. The IoT platform 125 also includes a core services layer 235 and an extensible object model (EOM) 250 comprising one or more knowledge graphs 251. The layers 205-235 further include various software components that together form each layer 205-235. For example, in one or more embodiments, each layer 205-235 includes one or more of the modules 141, models 142, engines 143, databases 144, services 145, applications 146, or combinations thereof. In some embodiments, the layers 205-235 are combined to form fewer layers. In some embodiments, some of the layers 205-235 are separated into separate, more numerous layers. In some embodiments, some of the layers 205-235 are removed while others may be added.

The IoT platform 125 is a model-driven architecture. Thus, in certain embodiments, the extensible object model 250 communicates with each layer 205-230 to contextualize site data of the enterprise 160a-160n using an extensible object model (or "asset model") and knowledge graphs 251 where the equipment (e.g., edge devices 161a-161n) and processes of the enterprise 160a-160n are modeled. The knowledge graphs 251 of EOM 250 are configured to store the models in a central location. The knowledge graphs 251 define a collection of nodes and links that describe real-world connections that enable smart systems. As used herein, a knowledge graph 251: (i) describes real-world entities (e.g., edge devices 161a-161n) and their interrelations organized in a graphical interface; (ii) defines possible classes and relations of entities in a schema; (iii) enables interrelating arbitrary entities with each other; and (iv) covers various topical domains. In other words, the knowledge graphs 251 define large networks of entities (e.g., edge devices 161a-161n), semantic types of the entities, properties of the entities, and relationships between the entities. Thus, the knowledge graphs 251 describe a network of "things" that are relevant to a specific domain or to an enterprise or organization. Knowledge graphs 251 are not limited to abstract concepts and relations, but can also contain instances of objects, such as, for example, documents and datasets. In some embodiments, the knowledge graphs 251 include resource description framework (RDF) graphs. As used herein, a "RDF graph" is a graph data model that formally describes the semantics, or meaning, of information. The RDF graph also represents metadata (e.g., data that describes data). According to various embodiments, knowledge graphs 251 also include a semantic object model. The semantic object model is a subset of a knowledge graph 251 that defines semantics for the knowledge graph 251. For example, the semantic object model defines the schema for the knowledge graph 251.

As used herein, EOM 250 is a collection of application programming interfaces (APIs) that enables seeded semantic object models to be extended. For example, the EOM 250 of the present disclosure enables a customer's knowledge graph 251 to be built subject to constraints expressed in the customer's semantic object model. Thus, the knowledge graphs 251 are generated by customers (e.g., enterprises or organizations) to create models of the edge devices 161a-161n of an enterprise 160a-160n, and the knowledge graphs 251 are input into the EOM 250 for visualizing the models (e.g., the nodes and links).

The models describe the assets (e.g., the nodes) of an enterprise (e.g., the edge devices 161a-161n) and describe the relationship of the assets with other components (e.g., the links). The models also describe the schema (e.g., describe what the data is), and therefore the models are self-validating. For example, in one or more embodiments, the model describes the type of sensors mounted on any given asset (e.g., edge device 161a-161n) and the type of data that is being sensed by each sensor. According to various embodiments, a key performance indicator (KPI) framework is used to bind properties of the assets in the extensible object model 250 to inputs of the KPI framework. Accordingly, the IoT platform 125 is an extensible, model-driven end-to-end stack including: two-way model sync and secure data exchange between the edge 115 and the cloud 105, metadata driven data processing (e.g., rules, calculations, and aggregations), and model driven visualizations and applications. As used herein, "extensible" refers to the ability to extend a data model to include new properties/columns/fields, new classes/tables, and new relations. Thus, the IoT platform 125 is extensible with regards to edge devices 161*a*-161*n* and the applications 146 that handle those devices 161*a*-161*n*. For example, when new edge devices 161*a*-161*n* are added to an enterprise 160*a*-160*n* system, the new devices 161*a*-161*n* will automatically appear in the IoT platform 125 so that the corresponding applications 146 understand and use the data from the new devices 161*a*-161*n*.

In some cases, asset templates are used to facilitate configuration of instances of edge devices 161*a*-161*n* in the model using common structures. An asset template defines the typical properties for the edge devices 161*a*-161*n* of a given enterprise 160*a*-160*n* for a certain type of device. For example, an asset template of a pump includes modeling the pump having inlet and outlet pressures, speed, flow, etc. The templates may also include hierarchical or derived types of edge devices 161*a*-161*n* to accommodate variations of a base type of device 161*a*-161*n*. For example, a reciprocating pump is a specialization of a base pump type and would include additional properties in the template. Instances of the edge device 161*a*-161*n* in the model are configured to match the actual, physical devices of the enterprise 160*a*-160*n* using the templates to define expected attributes of the device 161*a*-161*n*. Each attribute is configured either as a static value (e.g., capacity is 1000 BPH) or with a reference to a time series tag that provides the value. The knowledge graph 251 can automatically map the tag to the attribute based on naming conventions, parsing, and matching the tag and attribute descriptions and/or by comparing the behavior of the time series data with expected behavior.

In certain embodiments, the modeling phase includes an onboarding process for syncing the models between the edge 115 and the cloud 105. For example, in one or more embodiments, the onboarding process includes a simple onboarding process, a complex onboarding process, and/or a standardized rollout process. The simple onboarding process includes the knowledge graph 251 receiving raw model data from the edge 115 and running context discovery algorithms to generate the model. The context discovery algorithms read the context of the edge naming conventions of the edge devices 161*a*-161*n* and determine what the naming conventions refer to. For example, in one or more embodiments, the knowledge graph 251 receives "TMP" during the modeling phase and determine that "TMP" relates to "temperature." The generated models are then published. In certain embodiments, the complex onboarding process includes the knowledge graph 251 receiving the raw model data, receiving point history data, and receiving site survey data. According to various embodiments, the knowledge graph 251 then uses these inputs to run the context discovery algorithms. According to various embodiments, the generated models are edited and then the models are published. The standardized rollout process includes manually defining standard models in the cloud 105 and pushing the models to the edge 115.

The IoT layer 205 includes one or more components for device management, data ingest, and/or command/control of the edge devices 161*a*-161*n*. The components of the IoT layer 205 enable data to be ingested into, or otherwise received at, the IoT platform 125 from a variety of sources. For example, in one or more embodiments, data is ingested from the edge devices 161*a*-161*n* through process historians or laboratory information management systems. The IoT layer 205 is in communication with the edge connectors 165*a*-165*n* installed on the edge gateways 162*a*-162*n* through network 110, and the edge connectors 165*a*-165*n* send the data securely to the IoT platform 205. In some embodiments, only authorized data is sent to the IoT platform 125, and the IoT platform 125 only accepts data from authorized edge gateways 162*a*-162*n* and/or edge devices 161*a*-161*n*. According to various embodiments, data is sent from the edge gateways 162*a*-162*n* to the IoT platform 125 via direct streaming and/or via batch delivery. Further, after any network or system outage, data transfer will resume once communication is re-established and any data missed during the outage will be backfilled from the source system or from a cache of the IoT platform 125. According to various embodiments, the IoT layer 205 also includes components for accessing time series, alarms and events, and transactional data via a variety of protocols.

The enterprise integration layer 210 includes one or more components for events/messaging, file upload, and/or REST/OData. The components of the enterprise integration layer 210 enable the IoT platform 125 to communicate with third party cloud applications 211, such as any application(s) operated by an enterprise in relation to its edge devices. For example, the enterprise integration layer 210 connects with enterprise databases, such as guest databases, customer databases, financial databases, patient databases, etc. The enterprise integration layer 210 provides a standard application programming interface (API) to third parties for accessing the IoT platform 125. The enterprise integration layer 210 also enables the IoT platform 125 to communicate with the OT systems 163*a*-163*n* and IT applications 164*a*-164*n* of the enterprise 160*a*-160*n*. Thus, the enterprise integration layer 210 enables the IoT platform 125 to receive data from the third-party applications 211 rather than, or in combination with, receiving the data from the edge devices 161*a*-161*n* directly.

The data pipeline layer 215 includes one or more components for data cleansing/enriching, data transformation, data calculations/aggregations, and/or API for data streams. Accordingly, in one or more embodiments, the data pipeline layer 215 pre-processes and/or performs initial analytics on the received data. The data pipeline layer 215 executes advanced data cleansing routines including, for example, data correction, mass balance reconciliation, data conditioning, component balancing and simulation to ensure the desired information is used as a basis for further processing. The data pipeline layer 215 also provides advanced and fast computation. For example, in one or more embodiments, cleansed data is run through enterprise-specific digital twins. According to various embodiments, the enterprise-specific digital twins include a reliability advisor containing process models to determine the current operation and the fault models to trigger any early detection and determine an appropriate resolution. According to various embodiments, the digital twins also include an optimization advisor that integrates real-time economic data with real-time process data, selects the right feed for a process, and determines optimal process conditions and product yields.

According to various embodiments, the data pipeline layer 215 employs models and templates to define calculations and analytics. Additionally or alternatively, according to various embodiments, the data pipeline layer 215 employs models and templates to define how the calculations and analytics relate to the assets (e.g., the edge devices 161*a*-161*n*). For example, in an embodiment, a fan template defines fan efficiency calculations such that every time a fan is configured, the standard efficiency calculation is automatically executed for the fan. The calculation model defines the various types of calculations, the type of engine that should run the calculations, the input and output parameters, the preprocessing requirement and prerequisites, the schedule, etc. According to various embodiments, the actual calculation or analytic logic is defined in the template or it may be referenced. Thus, according to various embodiments, the calculation model is employed to describe and control the execution of a variety of different process models. According to various embodiments, calculation templates are linked with the asset templates such that when an asset (e.g., edge device 161a-161n) instance is created, any associated calculation instances are also created with their input and output parameters linked to the appropriate attributes of the asset (e.g., edge device 161a-161n).

According to various embodiments, the IoT platform 125 supports a variety of different analytics models including, for example, curve fitting models, regression analysis models, first principles models, empirical models, engineered models, user-defined models, machine learning models, built-in functions, and/or any other types of analytics models. Fault models and predictive maintenance models will now be described by way of example, but any type of models may be applicable.

Fault models are used to compare current and predicted enterprise 160a-160n performance to identify issues or opportunities, and the potential causes or drivers of the issues or opportunities. The IoT platform 125 includes rich hierarchical symptom-fault models to identify abnormal conditions and their potential consequences. For example, in one or more embodiments, the IoT platform 125 drill downs from a high-level condition to understand the contributing factors, as well as determining the potential impact a lower level condition may have. There may be multiple fault models for a given enterprise 160a-160n looking at different aspects such as process, equipment, control, and/or operations. According to various embodiments, each fault model identifies issues and opportunities in their domain, and can also look at the same core problem from a different perspective. According to various embodiments, an overall fault model is layered on top to synthesize the different perspectives from each fault model into an overall assessment of the situation and point to the true root cause.

According to various embodiments, when a fault or opportunity is identified, the IoT platform 125 provides recommendations about optimal corrective actions to take. Initially, the recommendations are based on expert knowledge that has been pre-programmed into the system by process and equipment experts. A recommendation services module presents this information in a consistent way regardless of source, and supports workflows to track, close out, and document the recommendation follow-up. According to various embodiments, the recommendation follow-up is employed to improve the overall knowledge of the system over time as existing recommendations are validated (or not) or new cause and effect relationships are learned by users and/or analytics.

According to various embodiments, the models are used to accurately predict what will occur before it occurs and interpret the status of the installed base. Thus, the IoT platform 125 enables operators to quickly initiate maintenance measures when irregularities occur. According to various embodiments, the digital twin architecture of the IoT platform 125 employs a variety of modeling techniques. According to various embodiments, the modeling techniques include, for example, rigorous models, fault detection and diagnostics (FDD), descriptive models, predictive maintenance, prescriptive maintenance, process optimization, and/or any other modeling technique.

According to various embodiments, the rigorous models are converted from process design simulation. In this manner, in certain embodiments, process design is integrated with feed conditions. Process changes and technology improvement provide business opportunities that enable more effective maintenance schedule and deployment of resources in the context of production needs. The fault detection and diagnostics include generalized rule sets that are specified based on industry experience and domain knowledge and can be easily incorporated and used working together with equipment models. According to various embodiments, the descriptive models identifies a problem and the predictive models determines possible damage levels and maintenance options. According to various embodiments, the descriptive models include models for defining the operating windows for the edge devices 161a-161n.

Predictive maintenance includes predictive analytics models developed based on rigorous models and statistic models, such as, for example, principal component analysis (PCA) and partial least square (PLS). According to various embodiments, machine learning methods are applied to train models for fault prediction. According to various embodiments, predictive maintenance leverages FDD-based algorithms to continuously monitor individual control and equipment performance. Predictive modeling is then applied to a selected condition indicator that deteriorates in time. Prescriptive maintenance includes determining an optimal maintenance option and when it should be performed based on actual conditions rather than time-based maintenance schedule. According to various embodiments, prescriptive analysis selects the right solution based on the company's capital, operational, and/or other requirements. Process optimization is determining optimal conditions via adjusting set-points and schedules. The optimized set-points and schedules can be communicated directly to the underlying controllers, which enables automated closing of the loop from analytics to control.

The data insight layer 220 includes one or more components for time series databases (TDSB), relational/document databases, data lakes, blob, files, images, and videos, and/or an API for data query. According to various embodiments, when raw data is received at the IoT platform 125, the raw data is stored as time series tags or events in warm storage (e.g., in a TSDB) to support interactive queries and to cold storage for archive purposes. According to various embodiments, data is sent to the data lakes for offline analytics development. According to various embodiments, the data pipeline layer 215 accesses the data stored in the databases of the data insight layer 220 to perform analytics, as detailed above.

The application services layer 225 includes one or more components for rules engines, workflow/notifications, KPI framework, insights (e.g., actionable insights), decisions, recommendations, machine learning, and/or an API for application services. The application services layer 225 enables building of applications 146a-d. The applications layer 230 includes one or more applications 146a-d of the IoT platform 125. For example, according to various embodiments, the applications 146a-d includes a buildings application 146a, a plants application 146b, an aero application 146c, and other enterprise applications 146d. According to various embodiments, the applications 146 includes general applications 146 for portfolio management, asset management, autonomous control, and/or any other custom applications. According to various embodiments, portfolio management includes the KPI framework and a flexible user interface (UI) builder. According to various embodiments, asset management includes asset performance, asset health, and/or asset predictive maintenance. According to various embodiments, autonomous control includes plantwide optimization, energy optimization and/or predictive maintenance. As detailed above, according to various embodiments, the general applications 146 is extensible such that each application 146 is configurable for the different types of enterprises 160*a*-160*n* (e.g., buildings application 146*a*, plants application 146*b*, aero application 146*c*, and other enterprise applications 146*d*).

The applications layer 230 also enables visualization of performance of the enterprise 160*a*-160*n*. For example, dashboards provide a high-level overview with drill downs to support deeper investigations. Recommendation summaries give users prioritized actions to address current or potential issues and opportunities. Data analysis tools support ad hoc data exploration to assist in troubleshooting and process improvement.

The core services layer 235 includes one or more services of the IoT platform 125. According to various embodiments, the core services 235 include data visualization, data analytics tools, security, scaling, and monitoring. According to various embodiments, the core services 235 also include services for tenant provisioning, single login/common portal, self-service admin, UI library/UI tiles, identity/access/entitlements, logging/monitoring, usage metering, API gateway/dev portal, and the IoT platform 125 streams.

Figure 3:
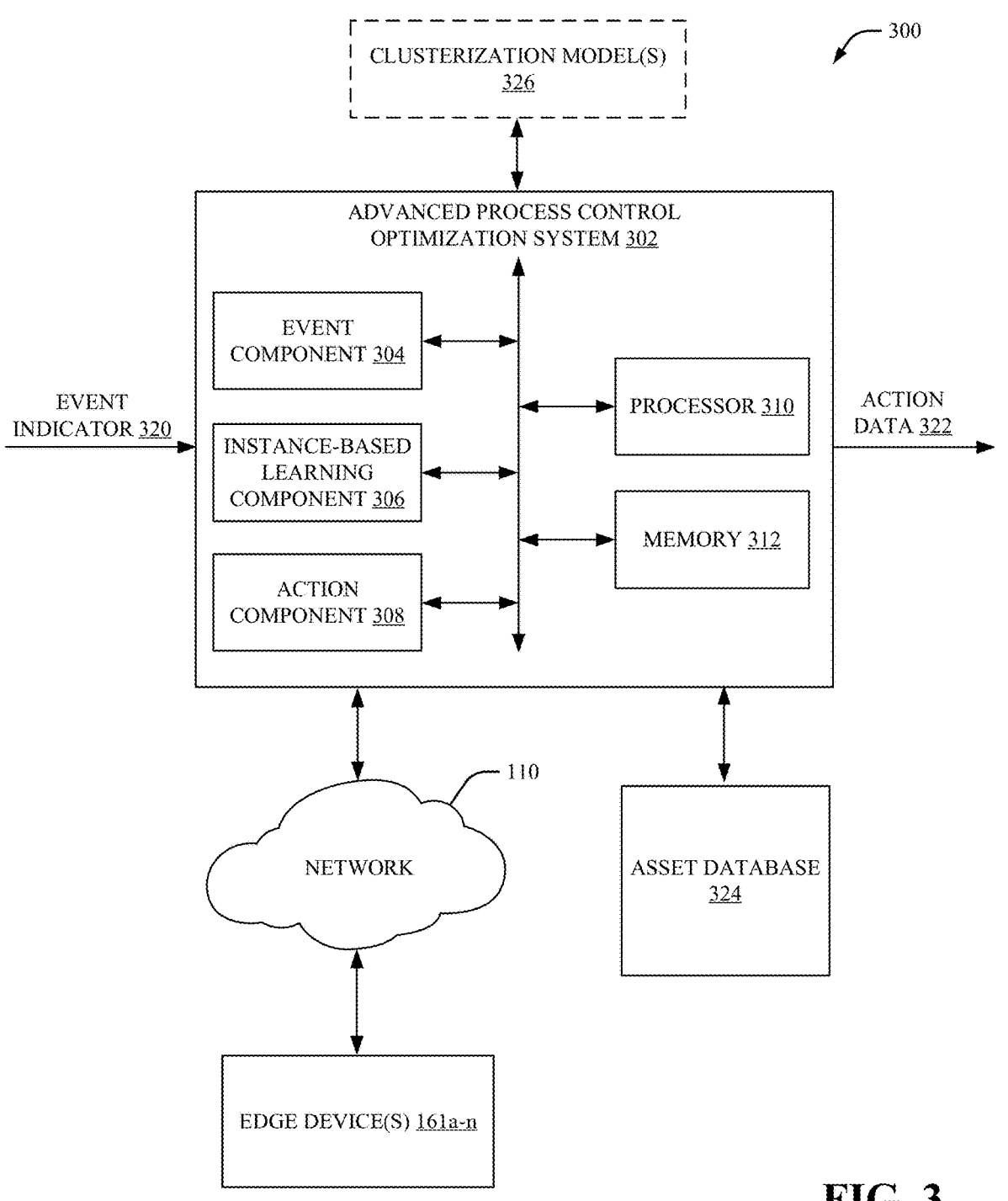
FIG. 3 illustrates a system that provides an exemplary advanced process control optimization system, in accordance with one or more embodiments described herein.

FIG. 3 illustrates a system 300 that provides an exemplary environment according to one or more described features of one or more embodiments of the disclosure. According to an embodiment, the system 300 includes an advanced process control optimization system 302 to facilitate a practical application of data analytics technology to provide instance-based modeling and optimization for assets and/or industrial processes. In various embodiments, the system 300 facilitates a practical application of data analytics technology and/or digital transformation technology to provide a dashboard visualization for assets and/or industrial processes. In one or more embodiments, the advanced process control optimization system 302 facilitates a practical application of rendering data related to dashboard technology to provide optimization related to assets and/or industrial processes. In one or more embodiments, the advanced process control optimization system 302 employs data that is aggregated from one or more assets and/or one or more data sources associated with an industrial system and/or another type of system (e.g., a building system, an enterprise system, etc.).

In an embodiment, the advanced process control optimization system 302 is a supervisory-level optimization platform associated with a server system (e.g., a server device), one or more data sources, and/or one or more assets. In one or more embodiments, the advanced process control optimization system 302 is a device with one or more processors and a memory. In one or more embodiments, the advanced process control optimization system 302 corresponds to a computer system from the computer systems 120 to facilitate providing advanced process control modeling for assets and/or industrial processes. In various embodiments, the advanced process control optimization system 302 additionally or alternatively provides a dashboard visualization associated with assets and/or industrial processes. For example, in one or more embodiments, the advanced process control optimization system 302 is implemented via the cloud 105. The advanced process control optimization system 302 is also related to one or more technologies, such as, for example, industrial technologies, enterprise technologies, connected building technologies, Internet of Things (IoT) technologies, data analytics technologies, digital transformation technologies, cloud computing technologies, cloud database technologies, server technologies, network technologies, private enterprise network technologies, wireless communication technologies, machine learning technologies, artificial intelligence technologies, digital processing technologies, electronic device technologies, computer technologies, supply chain analytics technologies, aircraft technologies, cybersecurity technologies, navigation technologies, asset visualization technologies, oil and gas technologies, petrochemical technologies, refinery technologies, process plant technologies, procurement technologies, and/or one or more other technologies.

Moreover, the advanced process control optimization system 302 provides an improvement to one or more technologies such as industrial technologies, enterprise technologies, connected building technologies, IoT technologies, data analytics technologies, digital transformation technologies, cloud computing technologies, cloud database technologies, server technologies, network technologies, private enterprise network technologies, wireless communication technologies, machine learning technologies, artificial intelligence technologies, digital processing technologies, electronic device technologies, computer technologies, supply chain analytics technologies, aircraft technologies, cybersecurity technologies, navigation technologies, asset visualization technologies, oil and gas technologies, petrochemical technologies, refinery technologies, process plant technologies, procurement technologies, and/or one or more other technologies. In an implementation, the advanced process control optimization system 302 improves performance of a computing device. For example, in one or more embodiments, the advanced process control optimization system 302 improves processing efficiency of a computing device (e.g., a user computing device), reduces power consumption of a computing device (e.g., a user computing device), improves quality of data provided by a computing device (e.g., a user computing device), etc.

The advanced process control optimization system 302 includes an event component 304, an instance-based learning component 306 and/or an action component 308. Additionally, in one or more embodiments, the advanced process control optimization system 302 includes a processor 310 and/or a memory 312. In certain embodiments, one or more aspects of the advanced process control optimization system 302 (and/or other systems, apparatuses and/or processes disclosed herein) constitute executable instructions embodied within a computer-readable storage medium (e.g., the memory 312). For instance, in an embodiment, the memory 312 stores computer executable component and/or executable instructions (e.g., program instructions). Furthermore, the processor 310 facilitates execution of the computer executable components and/or the executable instructions (e.g., the program instructions). In an example embodiment, the processor 310 is configured to execute instructions stored in the memory 312 or otherwise accessible to the processor 310.

The processor 310 is a hardware entity (e.g., physically embodied in circuitry) capable of performing operations according to one or more embodiments of the disclosure. Alternatively, in an embodiment where the processor 310 is embodied as an executor of software instructions, the software instructions configure the processor 310 to perform one or more algorithms and/or operations described herein in response to the software instructions being executed. In an embodiment, the processor 310 is a single core processor, a multi-core processor, multiple processors internal to the advanced process control optimization system 302, a remote processor (e.g., a processor implemented on a server), and/or a virtual machine. In certain embodiments, the processor 310 is in communication with the memory 312, the event component 304, the instance-based learning component 306 and/or the action component 308 via a bus to, for example, facilitate transmission of data among the processor 310, the memory 312, the event component 304, the instance-based learning component 306 and/or the action component 308. The processor 310 may be embodied in a number of different ways and, in certain embodiments, includes one or more processing devices configured to perform independently. Additionally or alternatively, in one or more embodiments, the processor 310 includes one or more processors configured in tandem via a bus to enable independent execution of instructions, pipelining of data, and/or multi-thread execution of instructions.

The memory 312 is non-transitory and includes, for example, one or more volatile memories and/or one or more non-volatile memories. In other words, in one or more embodiments, the memory 312 is an electronic storage device (e.g., a computer-readable storage medium). The memory 312 is configured to store information, data, content, one or more applications, one or more instructions, or the like, to enable the advanced process control optimization system 302 to carry out various functions in accordance with one or more embodiments disclosed herein. As used herein in this disclosure, the term "component," "system," and the like, is a computer-related entity. For instance, "a component," "a system," and the like disclosed herein is either hardware, software, or a combination of hardware and software. As an example, a component is, but is not limited to, a process executed on a processor, a processor, circuitry, an executable component, a thread of instructions, a program, and/or a computer entity.

The event component 304 is configured to receive an event indicator 320. In one or more embodiments, the event indicator 320 is related to a change event associated with operation of one or more assets and/or one or more industrial processes related to the one or more assets. For instance, in one or more embodiments, the event indicator 320 is related to a change event associated with edge devices 161a-161n (e.g., the edge devices 161a-161n included in a portfolio of assets). In one or more embodiments, the event indicator 320 includes one or more event descriptors that describes the one or more events associated with the one or more assets and/or the one or more industrial processes. In one or more embodiments, the event indicator 320 additionally or alternatively includes one or more asset descriptors that describe the one or more assets. For instance, in one or more embodiments, the event indicator 320 includes one or more asset descriptors that describe the edge devices 161a-161n. An asset descriptor includes, for example, an asset name, an asset identifier, an asset level and/or other information associated with an asset.

In one or more embodiments, the edge devices 161a-161n correspond to the one or more assets. In one or more embodiments, the one or more assets correspond to IoT devices (e.g., one or more industrial IoT devices), industrial equipment, factory equipment, one or more sensors, one or more actuators, one or more processors, one or more computers, one or more valves, one or more pumps (e.g., one or more centrifugal pumps, etc.), one or more motors, one or more compressors, one or more turbines, one or more ducts, one or more heaters, one or more chillers, one or more coolers, one or more boilers, one or more furnaces, one or more heat exchangers, one or more fans, one or more blowers, one or more conveyor belts, one or more connected building assets, one or more vehicle components, one or more cameras, one or more displays, one or more security components, one or more air handler units, one or more HVAC components, and/or one or more other devices that are connected to the network 110 for collecting, sending, and/or receiving information. In one or more embodiments, the edge device 161a-161n include, or is otherwise in communication with, one or more controllers for selectively controlling a respective edge device 161a-161n and/or for sending/receiving information between the edge devices 161a-161n and the advanced process control optimization system 302 via the network 110. In one or more embodiments, the edge devices 161a-161n are associated with an industrial environment (e.g., a plant, etc.). Additionally or alternatively, in one or more embodiments, the edge devices 161a-161n are associated with components of the edge 115 such as, for example, one or more enterprises 160a-160n.

A change event can be an anomaly condition, a fault condition, a defined process change with respect to one or more thresholds, a defined modeling change with respect to modeled data, a defined change with respect to grouping of asset data, a defined change in a statistical distribution of asset data, a defined changes with respect to one or more metrics, a defined changes with respect to an optimization objective, and/or another type of change event associated with an asset and/or an industrial process. In one or more embodiments, the event component 304 receives the event indicator 320 from one or more controllers associated with the edge devices 161a-161n. Additionally or alternatively, the event component 304 receives the event indicator 320 based on data provided by one or more clusterization models 326. In various embodiments, the event component 304 receives the event indicator 320 in response to a trigger condition associated with the one or more clusterization models 326. The one or more clusterization models 326 can be one or more clusterization models for the one or more assets and/or the one or more industrial processes. For example, the one or more clusterization models 326 can be configured for providing cluster analysis with respect to asset data and/or industrial process data by grouping the asset data and/or industrial process data into clusters of data based on similarity of respective attributes and/or features. In certain embodiments, the one or more clusterization models 326 provides grouping of data based on attributes, relationships, respective annotations and/or labels for asset data such as asset properties, asset locations, asset sites, asset details, asset activities, asset functionalities, asset configurations, asset components, asset services, asset priorities, operating settings and/or other asset information for respective assets. The trigger condition can be associated with a cluster change with respect to asset data and/or industrial process data modeled by the one or more clusterization models 326. For instance, the trigger condition associated with the one or more clusterization models 326 can be, for example, a condition in which particular data from the one or more clusterization models 326 transitions from a first grouping of data into a second grouping of data. The trigger condition associated with the one or more clusterization models 326 can additionally or alternatively be associated with another type of change for clustering of data by the one or more clusterization models 326.

In one or more embodiments, the advanced process control optimization system 302 aggregates asset data associated with the edge devices 161a-161n into an asset database 324. Furthermore, the one or more clusterization models 326 can employ the asset data stored in the asset database 324 to provide the cluster analysis with respect to the asset data. The asset database 324 is a cache memory (e.g., a database structure) that dynamically stores the data associated with the edge devices 161a-161n. In one or more embodiments, at least a portion of the asset data includes, for example, connected building data, sensor data, real-time data, live property value data, event data, process data, operational data, fault data, asset data, location data, and/or other data associated with the edge devices 161a-161n. Additionally or alternatively, in one or more embodiments, at least a portion of the asset data includes historical data, historical connected building data, historical sensor data, historical property value data, historical event data, historical process data, historical operational data, historical fault data, historical asset data, and/or other historical data associated with the edge devices 161a-161n. Additionally or alternatively, at least a portion of the asset data includes an aggregation of metrics and/or statistics associated with the aggregation of the asset data. For example, in certain embodiments, at least a portion of the asset data includes KPI data associated with the portfolio of assets. In one or more embodiments, the KPI data includes KPI metric data, duty KPI data, duty target KPI data, and/or other KPI data. In one or more embodiments, at least a portion of the asset data is obtained from one or more asset databases in communication with an advanced process control optimization system 302. For example, in certain embodiments, at least a portion of the asset data is obtained from an asset database 324. Additionally or alternatively, in certain embodiments, at least a portion of the asset data is obtained directly from the edge devices 161a-161n. In one or more embodiments, the asset data includes information related to trends, patterns and/or relationships between operating settings for one or more assets. In one or more embodiments, the asset data includes one or more attributes, labels, classifications, insights, inferences, machine learning data and/or other attributes related to the one or more assets and/or the one or more industrial processes.

In one or more embodiments, the advanced process control optimization system 302 repeatedly updates asset data of the asset database 324 based on the asset data provided by the edge devices 161a-161n during one or more intervals of time. For instance, in one or more embodiments, the advanced process control optimization system 302 stores new asset data and/or modified asset data associated with the edge devices 161a-161n. In one or more embodiments, the advanced process control optimization system 302 repeatedly scans the edge devices 161a-161n to determine new asset data for storage in the asset database 324. In one or more embodiments, the advanced process control optimization system 302 formats one or more portions of the asset data associated with the edge devices 161a-161n. For instance, in one or more embodiments, the advanced process control optimization system 302 provides a formatted version of the asset data associated with the edge devices 161a-161n to the asset database 324. In an embodiment, the formatted version of the asset data 314 is formatted with one or more defined formats associated with the one or more intervals of time and/or the one or more asset hierarchy levels. A defined format is, for example, a structure for data fields of the asset database 324. In various embodiments, the formatted version of the asset data associated with the edge devices 161a-161n is stored in the asset database 324.

In response to the event indicator 320, the instance-based learning component 306 determines one or more insights for one or more real-time settings for the one or more assets. In one or more embodiments, the one or more real-time settings include an operational range, one or more adjusted operating settings, one or more adjusted operational limits, one or more setpoint changes, and/or one or more other adjusted settings related to real-time operation of the one or more assets and/or one or more industrial processes related to the one or more assets. In one or more embodiments, the instance-based learning component 306 determines the one or more insights based at least in part on a comparison between one or more current operating condition digital signatures for the one or more assets and one or more historical operating condition digital signatures for the one or more assets. The one or more insights include one or more predictions, trends, relationships, correlations, differences, classifications, changes, recommended ranges, recommended limits, recommended setpoints, and/or other insights related to optimization of the one or more real-time settings for the one or more assets. In one or more embodiments, the one or more insights are one or more instance-based learning insights. Additionally, the one or more insights can be determined based on one or more machine learning techniques associated with instance-based learning. In one or more embodiments, the instance-based learning component 306 compares one or more current operating condition digital signatures and one or more historical operating condition digital signatures based on a distance similarity measure technique that determines similarity and/or a degree of difference between data in the one or more current operating condition digital signatures and one or more historical operating condition digital signatures. The distance similarity measure technique can include a Euclidean distance technique, a cosine similarity technique, and/or another type of distance similarity measure technique.

A current operating condition digital signature for an asset includes real-time asset data for an asset and/or an industrial process associated with the asset. Additionally, a current operating condition digital signature can be an encoded data structure (e.g., a digital fingerprint) that maps the real-time asset data to a particular digital data format associated with the real-time asset data. In one or more embodiments, the current operating condition digital signature can be related to the one or more real-time settings. The real-time asset data can include real-time asset context data, real-time plant context data, real-time operational variables, real-time limits, real-time setpoints, real-time sensor data, real-time event data, real-time process data, real-time fault data, real-time machine-learning data, real-time metrics data, location data, KPI data, KPI metric data, duty KPI data, duty target KPI data, and/or other real-time asset data associated with the asset, an industrial process related to the asset, and/or real-time operating settings for the asset.

A historical operating condition digital signature for an asset includes historical asset data for the asset and/or the industrial process associated with the asset. Additionally, a historical operating condition digital signature can be an encoded data structure (e.g., a digital fingerprint) that maps the historical asset data to a particular digital data format associated with the historical asset data. The historical asset data can include historical asset context data, historical plant context data, historical operational variables, historical limits, historical setpoints, historical sensor data, historical event data, historical process data, historical fault data, historical machine-learning data, historical metrics data, location data, historical KPI data, historical KPI metric data, historical duty KPI data, historical duty target KPI data, and/or other historical asset data associated with the asset, an industrial process related to the asset, and/or historical operating settings for the asset.

In one or more embodiments, the instance-based learning component 306 generates a current operating condition digital signature for an asset by filtering respective real-time asset data related to the asset. In various embodiments, the instance-based learning component 306 generates a current operating condition digital signature for an asset by filtering at least current operational variables and/or asset context data for the asset. In various embodiments, the instance-based learning component 306 filters the real-time asset data based on one or more clustering thresholds for respective clusters of data associated with the one or more clusterization models 326. Additionally or alternatively, the instance-based learning component 306 filters the asset data based on one or more noise thresholds for the real-time asset data and/or one or more accuracy metrics for the real-time asset data. In various embodiments, the instance-based learning component 306 additionally or alternatively filters the real-time asset data based on a set of features included in one or more historical operating condition digital signatures. For example, the instance-based learning component 306 can configure the current operating condition digital signature based on a set of candidate features for one or more historical operating conditions and/or one or more historical operating settings. In various embodiments, the instance-based learning component 306 additionally or alternatively filters the real-time asset data based on a set of predefined events associated with the asset. In various embodiments, the instance-based learning component 306 determines non-decision variables and/or decision variables associated with real-time asset data and performs distinct filtering processes with respect to the real-time asset data based on the non-decision variables and/or decision variables.

In one or more embodiments, the instance-based learning component 306 additionally adjusts the one or more real-time settings for the one or more assets based on the one or more insights to provide one or more adjusted settings for the one or more assets and/or one or more industrial processes related to the one or more assets. The one or more adjusted settings can be, for example, an operational range, one or more adjusted operating settings, one or more adjusted operational limits, one or more setpoint changes, and/or one or more other adjusted settings for the one or more assets and/or one or more industrial processes related to the one or more assets. In one or more embodiments, the one or more adjusted settings can provide improved (e.g., optimized) processing efficiency, processing performance, and/or product quality for one or more industrial processes and/or related assets as compared to one or more prior industrial processes associated with one or more settings limits for the one or more industrial processes prior to the one or more adjusted settings.

Additionally, in one or more embodiments, the action component 308 performs one or more actions based on the one or more adjusted settings for the one or more assets and/or the one or more industrial processes related to the one or more assets. In various embodiments, the action component 308 generates action data 322 related to the one or more actions. In certain embodiments, the action data 322 includes dashboard visualization data, spreadsheet data, graphing tool data, computer executable instructions, one or more control signals for one or more controllers, data files, metadata, and/or other data related to the one or more adjusted settings.

In one or more embodiments, the action component 308 generates the action data 322 to facilitate providing a dashboard visualization associated with the action data 322. For example, in one or more embodiments, the action component 308 configures a dashboard visualization for an electronic interface of a computing device based on the one or more adjusted settings and/or the action data 322 configured based on the one or more adjusted settings. In one or more embodiments, the action component 308 transmits the action data 322 via the network 110. In certain embodiments, action component 308 incorporates encryption capabilities to facilitate encryption and/or decryption of one or more portions of the action data 322.

In one or more embodiments, the dashboard visualization is configured to provide the one or more adjusted settings as respective interactive display elements via the electronic interface. An interactive display element is a portion of the dashboard visualization (e.g., a user-interactive electronic interface portion) that provides interaction with respect to a user of the user computing device. For example, in one or more embodiments, an interactive display element is an interactive display element associated with a set of pixels that allows a user to provide feedback and/or to perform one or more actions with respect to the dashboard visualization. In an embodiment, in response to interaction with an interactive display element, the dashboard visualization is dynamically altered to display one or more altered portions of the dashboard visualization associated with different visual data and/or different interactive display elements.

Additionally, in one or more embodiments, the dashboard visualization is configured to facilitate execution and/or initiation of one or more actions via the dashboard visualization based on the action data 322. In an embodiment, an action is executed and/or initiated via an interactive display element of the dashboard visualization. In certain embodiments, an action from the one or more actions includes generating one or more notifications associated with the prioritized actions for the portfolio of assets. In one or more embodiments, the action data 322 includes a control signal configured based at least in part on the one or more adjusted settings. Furthermore, the control signal can be transmitted to a controller configured for optimization associated with the one or more assets. In one or more embodiments, the control signal is configured based on one or more communication protocols and/or one or more industrial control system protocols associated with the controller. In certain embodiments, the action data 322 can be configured to update one or more machine learning models based updated operation data for the one or more assets and/or one or more processes related to the one or more assets. The updated operational data can be more recent operational data as compared to operational data associated with the current operating condition digital signature. For example, in certain embodiments, the action data 322 can be configured to update one or more machine learning models based on the one or more adjusted settings. The one or more machine learning models can include the one or more clusterization models 326, one or more predictive models, and/or one or more other machine learning models associated with the one or more assets and/or the one or more industrial processes. In certain embodiments, an action from the one or more actions includes an action associated with the application services layer 225, the applications layer 230, and/or the core services layer 235.

Additionally, in response to the optimization request 720, the control component 708 transmits a control signal configured based at least in part on the one or more real-time operating limits to a controller configured for optimization associated with the industrial process that produces the industrial process product. In one or more embodiments, the control component 708 configures the control signal based on a comparison between the adjusted one or more real-time operating limits and multivariate control criteria for the industrial process. The multivariate control criteria can be associated with optimization objectives for the industrial process and/or plantwide industrial processes. In various embodiments, the adjusted one or more real-time operating limits correspond to an asset capability for the one or more assets and/or one or more industrial processes.

Figure 4:
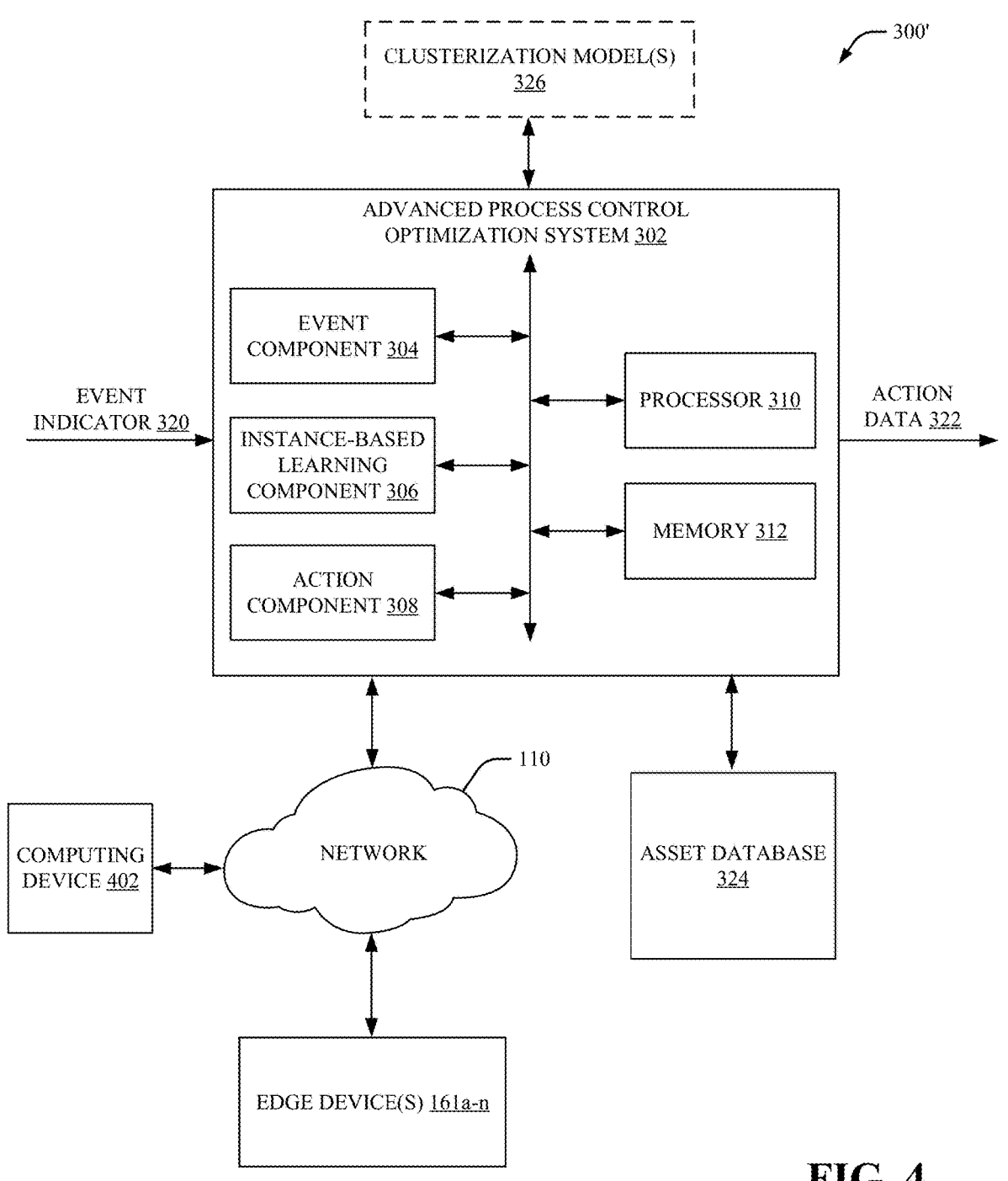
FIG. 4 illustrates another system that provides an exemplary advanced process control optimization system, in accordance with one or more embodiments described herein.

FIG. 4 illustrates a system 300' that provides an exemplary environment according to one or more described features of one or more embodiments of the disclosure. In an embodiment, the system 300' corresponds to an alternate embodiment of the system 300 shown in FIG. 3. According to an embodiment, the system 300' includes the advanced process control optimization system 302, the edge devices 161a-161n, the asset database 324, the one or more clusterization models 326, and/or a computing device 402. In one or more embodiments, the advanced process control optimization system 302 is in communication with the edge devices 161a-161n and/or the computing device 402 via the network 110. The computing device 402 is a user computing device, a mobile computing device, a smartphone, a tablet computer, a mobile computer, a desktop computer, a laptop computer, a workstation computer, a wearable device, a virtual reality device, an augmented reality device, or another type of computing device located remote from the advanced process control optimization system 302.

In one or more embodiments, the action component 308 communicates the action data 322 to the computing device 402. For example, in one or more embodiments, the action data 322 includes one or more visual elements for a visual display (e.g., a user-interactive electronic interface) of the computing device 402 that renders a visual representation of the one or more adjusted settings. In one or more other embodiments, the action component 308 transmits the action data 322 to the edge devices 161a-161n and/or a processing device (e.g., a controller) communicatively coupled to the edge devices 161a-161n to, for example, alter one or more settings and/or one or more industrial processes for the one or more assets. In another example, in one or more embodiments, the action data 322 includes one or notifications associated with the one or more adjusted settings. In one or more embodiments, the action data 322 allows a user associated with the computing device 402 to make decisions and/or perform one or more actions with respect to the one or more assets. In one or more embodiments, the action data 322 allows a user associated with the computing device 402 to control the one or more portions of the one or more assets (e.g., one or more portions of the edge devices 161a-161n).

Figure 5:
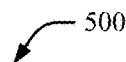
FIG. 5 illustrates an exemplary computing device, in accordance with one or more embodiments described herein.

FIG. 5 illustrates a system 500 according to one or more embodiments of the disclosure. The system 500 includes the computing device 402. In one or more embodiments, the computing device 402 employs mobile computing, augmented reality, cloud-based computing, IoT technology and/or one or more other technologies to provide performance data, video, audio, text, graphs, charts, real-time data, graphical data, one or more communications, one or more messages, one or more notifications, and/or other media data associated with the one or more performance assurance insights. The computing device 402 includes mechanical components, electrical components, hardware components and/or software components to facilitate determining performance assurance insights with respect to one or more assets. In the embodiment shown in FIG. 5, the computing device 402 includes a visual display 504, one or more speakers 506, one or more cameras 508, one or more microphones 510, a global positioning system (GPS) device 512, a gyroscope 514, one or more wireless communication devices 516, and/or a power supply 518.

In an embodiment, the visual display 504 is a display that facilitates presentation and/or interaction with one or more portions of dashboard visualization data. In one or more embodiments, the computing device 402 displays an electronic interface (e.g., a graphical user interface) associated with the advanced process control optimization system 302. In one or more embodiments, the visual display 504 is a visual display that renders one or more interactive media elements via a set of pixels. The one or more speakers 506 include one or more integrated speakers that project audio. The one or more cameras 508 include one or more cameras that employ autofocus and/or image stabilization for photo capture and/or real-time video. In certain embodiments, the one or more microphones 510 include one or more digital microphones that employ active noise cancellation to capture audio data. The GPS device 512 provides a geographic location for the computing device 402. The gyroscope 514 provides an orientation for the computing device 402. The one or more wireless communication devices 516 includes one or more hardware components to provide wireless communication via one or more wireless networking technologies and/or one or more short-wavelength wireless technologies. The power supply 518 is, for example, a power supply and/or a rechargeable battery that provides power to the visual display 504, the one or more speakers 506, the one or more cameras 508, the one or more microphones 510, the GPS device 512, the gyroscope 514, and/or the one or more wireless communication devices 516. In certain embodiments, the action data 322 associated with the one or more adjusted settings is presented via the visual display 504 and/or the one or more speakers 506.

Figure 6:
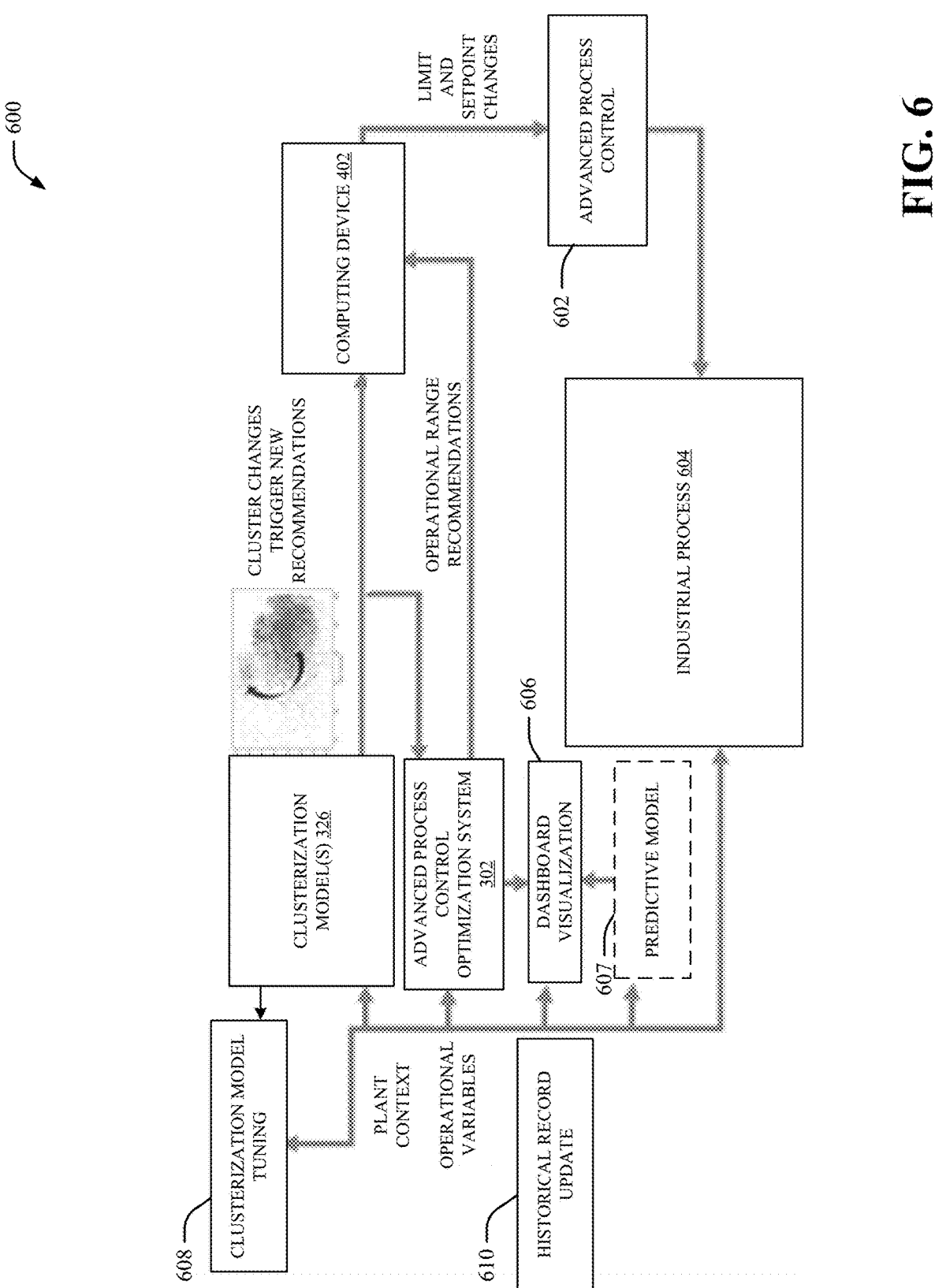
FIG. 6 illustrates a system associated with advanced process control for assets and/or processes using instance-based learning, in accordance with one or more embodiments described herein.

FIG. 6 illustrates a system 600 according to one or more embodiments of the disclosure. In one or more embodiments, the system 600 is an advanced process control system associated with instance-based learning. The system 600 includes the advanced process control optimization system 302, the one or more clusterization models 326, and/or the computing device 402. The advanced process control optimization system 302 can provide optimization for advanced process control 602 configured to control at least an industrial process 604 associated with one or more assets. For example, the advanced process control 602 can be an industrial process control system (e.g., an industrial process control and automation system, etc.) associated with various controllers and/or other devices for controlling one or more portions of the industrial process 604. In various embodiments, the advanced process control 602 additionally or alternatively includes one or more processing devices and one or more memories for storing instructions and data used, generated, or collected by the one or more processing devices. In one or more embodiments, controllers each include at least one network interface such as one or more Ethernet interfaces or one or more wireless transceivers. In various embodiments, the advanced process control 602 additionally or alternatively includes one or more sensors, one or more actuators, one or more servers, one or more operator stations, one or more networks, and/or one or more other components for controlling the industrial process 604. In certain embodiments, the advanced process control 602 provides control signals, multivariable control functions, and/or other signals to the industrial process 604. The industrial process 604 can be performed based on continuous operations, automated operations, batch operations, batch blending recipes, cycles, and/or other steps to manufacture and/or produce one or more products, commodities, or other output.

In various embodiments, the action data 322 provided by the advanced process control optimization system 302 can provide one or more operational range recommendations, one or more operating limit changes, one or more setpoint changes, and/or other data to the computing device 402 and/or the advanced process control 602. In various embodiments, the action data 322 provided by the advanced process control optimization system 302 can additionally or alternatively configure a dashboard visualization 606 to render visualization data associated with one or more adjusted settings. In one or more embodiments, the dashboard visualization 606 can be rendered via an electronic interface of the computing device 402 and/or another computing device. In certain embodiments, the dashboard visualization 606 can additionally be configured based on predictive insights provided by a predictive model 607 associated with the industrial process 604. In various embodiments, the action data 322 provided by the advanced process control optimization system 302 can additionally or alternatively be employed for clusterization model tuning 608 related to the one or more clusterization models 326. The clusterization model tuning 608 can include tuning of parameter, hyperparameters, weights, variables, thresholds, and/or other model configuration data for the one or more clusterization models 326. Additionally, in one or more embodiments, the advanced process control optimization system 302 can be configured to repeatedly perform historical record updates 610 (e.g., on a monthly basis) in order to update, for example, historical asset data stored in the asset database 324. For example, historical data can be adapted with more recent normal operational data.

In one or more embodiments, the advanced process control optimization system 302 selects variables that are relevant to operational throughput for the industrial process 604 and partitions the variables into non-decision variables and decision variables for the industrial process 604. In one or more embodiments, the advanced process control optimization system 302 performs data cleaning to remove outlier data, noisy data, inaccurate data and/or periods which contain violation of known constraints and unstable operation. In one or more embodiments, the advanced process control optimization system 302 removes data associated with shutdown period and/or search for data associated with an extended operational period. In one or more embodiments, the advanced process control optimization system 302 identifies steady state normal operational records from an extended operational period. In one or more embodiments, the advanced process control optimization system 302 filters operational records by current values of non-decision variables and/or by one or more historical intervals of time. In one or more embodiments, the advanced process control optimization system 302 filters operational records with throughput higher than current values. Additionally or alternatively, from the reduced filtered instances, the advanced process control optimization system 302 computes and compares distance/similarity measures (e.g., Euclidean distance, cosine similarity, etc.) with current operating conditions based on decision variables.

In one or more embodiments, the advanced process control optimization system 302 provides one or more recommendations (e.g., a set of instances) based on higher throughputs with minimum changes criteria (e.g., provide a recommendation based on a set of historical records that are most similar to the current operating conditions), higher throughputs criteria (e.g., provide a recommendation based on historical records with highest throughputs and return a subset based on similarity to current operating conditions), and/or highest possible throughput criteria (e.g., provide a recommendation based on a set of historical records with highest throughputs). In various embodiments, the dashboard visualization 606 displays values of decision variables, non-decision variables and throughput, timestamps, distance/similarity measures, trends, and/or other data.

Figure 7:
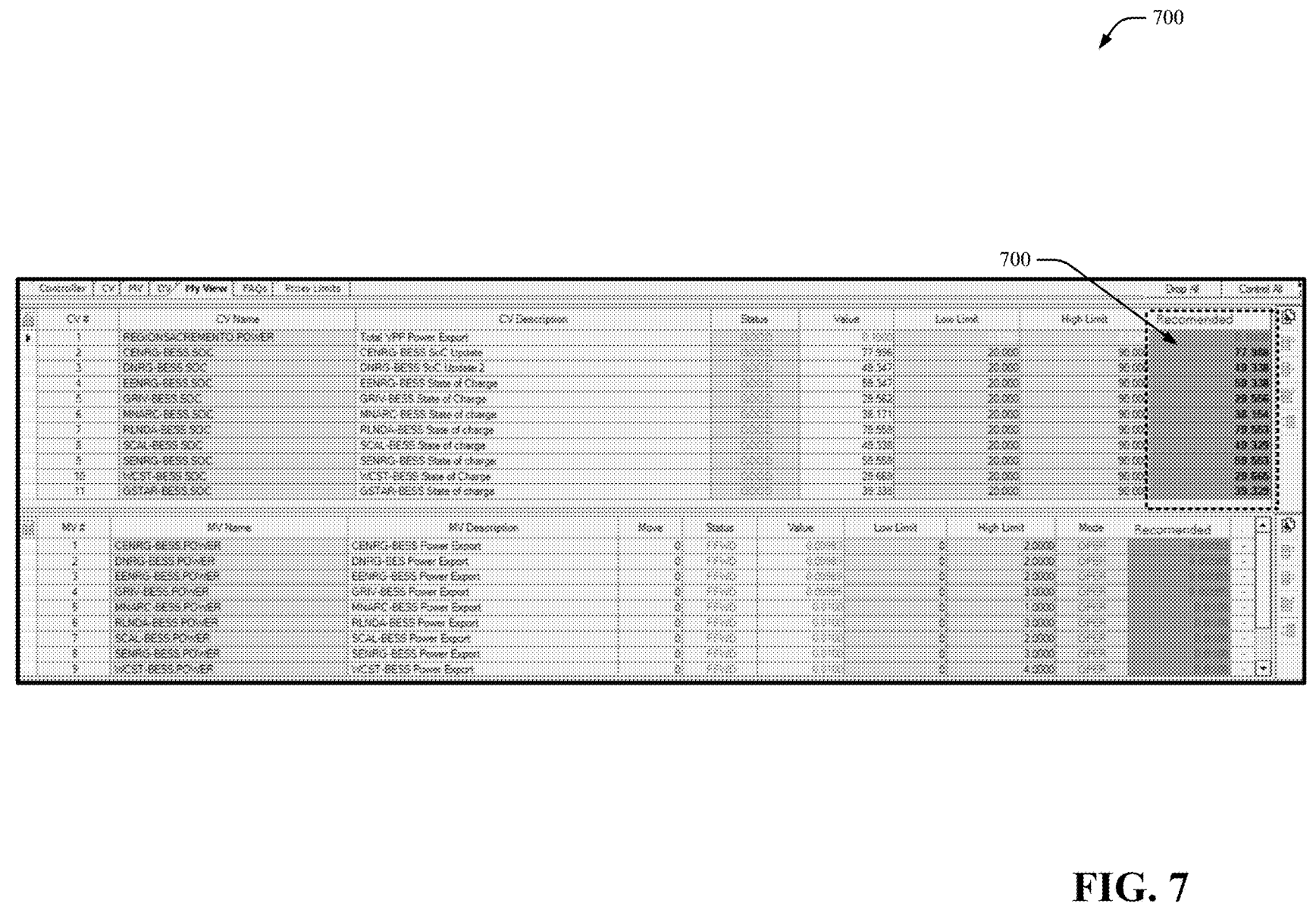

FIG. 7 illustrates an exemplary electronic interface 700 according to one or more embodiments of the disclosure. In an embodiment, the electronic interface 700 is an electronic interface of the computing device 402 that is presented via the visual display 504. In one or more embodiments, a dashboard visualization is presented via the electronic interface 700. In certain embodiments, the data visualization presented via the electronic interface 700 presents a visualization associated with the action data 322. For example, the data visualization presented via the electronic interface 700 can present a visualization associated with one or more adjusted settings for one or more assets. In various embodiments, the electronic interface 700 presents instance-based recommended targets for one or more operating settings for one or more assets.

Figure 8:
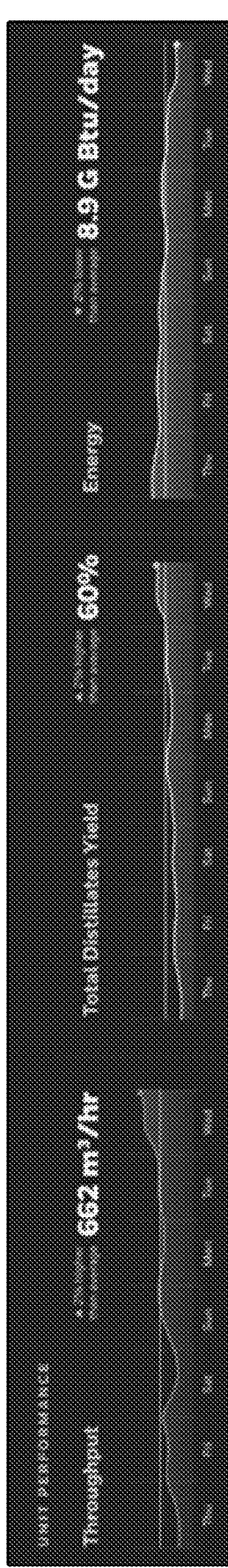
FIG. 8 illustrates another exemplary electronic interface, in accordance with one or more embodiments described herein.

FIG. 8 illustrates an exemplary electronic interface 800 according to one or more embodiments of the disclosure. In an embodiment, the electronic interface 800 is an electronic interface of the computing device 402 that is presented via the visual display 504. In one or more embodiments, a dashboard visualization is presented via the electronic interface 800. In certain embodiments, the data visualization presented via the electronic interface 800 presents a visualization associated with the action data 322. For example, the data visualization presented via the electronic interface 800 can present a visualization associated with one or more adjusted settings for one or more assets. In various embodiments, the electronic interface 800 presents trends related to one or more assets and/or one or more industrial processes. In various embodiments, the electronic interface 800 presents a visualization related to historical operating data matching one or more current operating points (e.g., one or more operating settings) for one or more assets and/or one or more industrial processes.

FIG. 9 illustrates a method 900 for advanced process control for assets and/or processes using instance-based learning, in accordance with one or more embodiments described herein. The method 900 is associated with the advanced process control optimization system 302, for example. For instance, in one or more embodiments, the method 900 is executed at a device (e.g., the advanced process control optimization system 302) with one or more processors and a memory. In one or more embodiments, the method 900 facilitates optimization of an asset, an industrial process and/or plantwide industrial processes. In one or more embodiments, the method 900 begins at block 902 that receives (e.g., by the event component 304) an event indicator related to a change event associated with operation of an asset. The event indicator provides one or more technical improvements such as, but not limited to, facilitating interaction with a computing device, extended functionality for a computing device, improving accuracy of data provided to a computing device, improving performance of an asset, and/or improving performance of an industrial process. In certain embodiments, receiving the event indicator includes receiving the event indicator in response to a trigger condition associated with a clusterization model for the asset. Alternatively, in certain embodiments, receiving the event indicator includes receiving the event indicator in response to a cluster change with respect to asset data for the asset.

At block 904, it is determined whether the event indicator is processed. If no, block 904 is repeated to determine whether the event indicator is processed. If yes, the method 900 proceeds to block 906. In response to the event indicator, block 906 determines (e.g., by the instance-based learning component 306) one or more insights for one or more real-time settings for the asset based at least in part on a comparison between a current operating condition digital signature for the asset and historical operating condition digital signature for the asset. The determining the one or more insights provides one or more technical improvements such as, but not limited to, extended functionality for a computing device, improving accuracy of data provided to a computing device, improving performance of an asset, and/or improving performance of an industrial process. In one or more embodiments, the one or more insights are one or more instance-based learning insights. For example, in one or more embodiments, determining the one or more insights includes determining one or more instance-based learning insights for the one or more real-time settings based at least in part on a comparison between the current operating condition digital signature for the asset and the historical operating condition digital signature for the asset. Additionally or alternatively, in one or more embodiments, the one or more real-time settings for the asset are one or more real-time operating settings for the asset.

The method 900 also includes a block 908 that, in response to the event indicator, adjusts (e.g., by the instance-based learning component 306) the one or more real-time settings for the asset based on the one or more insights to provide one or more adjusted settings for the asset. The adjusting provides one or more technical improvements such as, but not limited to, extended functionality for a computing device, improving accuracy of data provided to a computing device, improving performance of an asset, and/or improving performance of an industrial process.

The method 900 also includes a block 910 that, in response to the event indicator, performs (e.g., by the action component 308) one or more actions based on the one or more adjusted settings for the asset. The performing the one or more actions provides one or more technical improvements such as, but not limited to, providing a varied experience for a computing device, improving performance of an asset, and/or improving performance of an industrial process. In one or more embodiments, the one or more adjusted settings for the asset is one or more adjusted operating settings for the asset.

In one or more embodiments, the method 900 additionally or alternatively includes generating the current operating condition digital signature for the asset by filtering current operational variables and asset context data for the asset. In one or more embodiments, filtering the current operational variables and the asset context data for the asset includes filtering the asset data based on one or more clustering thresholds, one or more noise thresholds, one or more accuracy metrics, a set of features included in the historical operating condition digital signature, and/or a set of predefined events associated with the asset.

In one or more embodiments, the method 900 additionally or alternatively includes determining non-decision variables and decision variables associated with asset data. In one or more embodiments, the method 900 additionally or alternatively includes performing distinct filtering processes with respect to the asset data based on the non-decision variables and decision variables.

In one or more embodiments, the method 900 additionally or alternatively includes configuring the current operating condition digital signature based on a set of candidate features for historical operating conditions.

In one or more embodiments, the method 900 additionally or alternatively includes comparing the current operating condition digital signature and the historical operating condition digital signature based on a distance similarity measure technique.

In one or more embodiments, the method 900 additionally or alternatively includes configuring the one or more adjusted settings for the asset based on one or more historical operating condition digital signatures that are determined to be most similar to the current operating condition digital signature. In one or more embodiments, the method 900 additionally or alternatively includes configuring the one or more adjusted settings for the asset based on one or more historical operating condition digital signatures associated with a defined type of operation throughput variable.

In one or more embodiments, the method 900 additionally or alternatively includes configuring a dashboard visualization for an electronic interface of a computing device based on the one or more adjusted settings for the asset. In one or more embodiments, the method 900 additionally or alternatively includes transmitting a control signal configured based at least in part on the one or more adjusted settings for the asset to a controller configured for optimization associated with the asset. In one or more embodiments, the method 900 additionally or alternatively includes updating one or more machine learning models (e.g., updating one or more tuning of parameter, hyperparameters, weights, variables, thresholds, and/or other model configuration data for the one or more clusterization models 326) based on updated operational data for the asset. In one or more embodiments, the method 900 additionally or alternatively includes updating one or more machine learning models (e.g., updating one or more tuning of parameter, hyperparameters, weights, variables, thresholds, and/or other model configuration data for the one or more clusterization models 326) based on updated operational data for one or more processes related to the asset.

FIG. 10 illustrates a method 1000 for advanced process control for assets and/or processes using instance-based learning, in accordance with one or more other embodiments described herein. The method 1000 is associated with the advanced process control optimization system 302, for example. For instance, in one or more embodiments, the method 1000 is executed at a device (e.g., the advanced process control optimization system 302) with one or more processors and a memory. In one or more embodiments, the method 1000 facilitates optimization of an asset, an industrial process and/or plantwide industrial processes. In one or more embodiments, the method 1000 begins at block 1002 that receives (e.g., by the event component 304) an event indicator related to a trigger condition associated with a clusterization model for an asset. The event indicator provides one or more technical improvements such as, but not limited to, facilitating interaction with a computing device, extended functionality for a computing device, improving accuracy of data provided to a computing device, improving performance of an asset, and/or improving performance of an industrial process.

At block 1004, it is determined whether the event indicator is processed. If no, block 1004 is repeated to determine whether the event indicator is processed. If yes, the method 1000 proceeds to block 1006. In response to the event indicator, block 1006 determines (e.g., by the instance-based learning component 306) one or more insights for one or more real-time settings for the asset based at least in part on a comparison between a current operating condition digital signature for the asset and historical operating condition digital signature for the asset. The determining the one or more insights provides one or more technical improvements such as, but not limited to, extended functionality for a computing device, improving accuracy of data provided to a computing device, improving performance of an asset, and/or improving performance of an industrial process. In one or more embodiments, the one or more insights are one or more instance-based learning insights. For example, in one or more embodiments, the determining the one or more insights comprises determining one or more instance-based learning insights for the one or more real-time settings based at least in part on a comparison between the current operating condition digital signature for the asset and the historical operating condition digital signature for the asset. Additionally or alternatively, in one or more embodiments, the one or more real-time settings for the asset are one or more real-time operating settings for the asset.

The method 1000 also includes a block 1008 that, in response to the event indicator, adjusts (e.g., by the instance-based learning component 306) the one or more real-time settings for the asset based on the one or more insights to provide one or more adjusted settings for the asset. The adjusting provides one or more technical improvements such as, but not limited to, extended functionality for a computing device, improving accuracy of data provided to a computing device, improving performance of an asset, and/or improving performance of an industrial process.

The method 1000 also includes a block 1010 that, in response to the event indicator, performs (e.g., by the action component 308) one or more actions based on the one or more adjusted settings for the asset. The performing the one or more actions provides one or more technical improvements such as, but not limited to, providing a varied experience for a computing device, improving performance of an asset, and/or improving performance of an industrial process. In one or more embodiments, the one or more adjusted settings for the asset is one or more adjusted operating settings for the asset.

FIG. 11 illustrates a method 1100 for advanced process control for assets and/or processes using instance-based learning, in accordance with one or more other embodiments described herein. The method 1100 is associated with the advanced process control optimization system 302, for example. For instance, in one or more embodiments, the method 1100 is executed at a device (e.g., the advanced process control optimization system 302) with one or more processors and a memory. In one or more embodiments, the method 1100 facilitates optimization of an asset, an industrial process and/or plantwide industrial processes. In one or more embodiments, the method 1100 begins at block 1102 that receives (e.g., by the event component 304) an event indicator related to a change event associated with operation of an asset. The event indicator provides one or more technical improvements such as, but not limited to, facilitating interaction with a computing device, extended functionality for a computing device, improving accuracy of data provided to a computing device, improving performance of an asset, and/or improving performance of an industrial process.

At block 1104, it is determined whether the event indicator is processed. If no, block 1104 is repeated to determine whether the event indicator is processed. If yes, the method 1100 proceeds to block 1106. In response to the event indicator, block 1106 generates (e.g., by the instance-based learning component 306) a current operating condition digital signature for the asset by filtering current operational variables and/or asset data for the asset. The generating the current operating condition digital signature provides one or more technical improvements such as, but not limited to, extended functionality for a computing device, improving accuracy of data provided to a computing device, improving performance of an asset, and/or improving performance of an industrial process.

The method 1100 also includes a block 1108 that, in response to the event indicator, determines (e.g., by the instance-based learning component 306) one or more insights for one or more real-time settings for the asset based at least in part on a comparison between the current operating condition digital signature for the asset and historical operating condition digital signature for the asset. The determining the one or more insights provides one or more technical improvements such as, but not limited to, extended functionality for a computing device, improving accuracy of data provided to a computing device, improving performance of an asset, and/or improving performance of an industrial process. In one or more embodiments, the one or more insights are one or more instance-based learning insights. For example, in one or more embodiments, the determining the one or more insights comprises determining one or more instance-based learning insights for the one or more real-time settings based at least in part on a comparison between the current operating condition digital signature for the asset and the historical operating condition digital signature for the asset. Additionally or alternatively, in one or more embodiments, the one or more real-time settings for the asset are one or more real-time operating settings for the asset.

The method 1100 also includes a block 1110 that, in response to the event indicator, adjusts (e.g., by the instance-based learning component 306) the one or more real-time settings for the asset based on the one or more insights to provide one or more adjusted settings for the asset. The adjusting provides one or more technical improvements such as, but not limited to, extended functionality for a computing device, improving accuracy of data provided to a computing device, improving performance of an asset, and/or improving performance of an industrial process.

The method 1100 also includes a block 1112 that, in response to the event indicator, performs (e.g., by the action component 308) one or more actions based on the one or more adjusted settings for the asset. The performing the one or more actions provides one or more technical improvements such as, but not limited to, providing a varied experience for a computing device, improving performance of an asset, and/or improving performance of an industrial process. In one or more embodiments, the one or more adjusted settings for the asset is one or more adjusted operating settings for the asset.

FIG. 12 depicts an example system 1200 that may execute techniques presented herein. FIG. 12 is a simplified functional block diagram of a computer that may be configured to execute techniques described herein, according to exemplary embodiments of the present disclosure. Specifically, the computer (or "platform" as it may not be a single physical computer infrastructure) may include a data communication interface 1260 for packet data communication. The platform also may include a central processing unit ("CPU") 1220, in the form of one or more processors, for executing program instructions. The platform may include an internal communication bus 1210, and the platform also may include a program storage and/or a data storage for various data files to be processed and/or communicated by the platform such as ROM 1230 and RAM 1240, although the system 1200 may receive programming and data via network communications. The system 1200 also may include input and output ports 1250 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments can be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

It is to be appreciated that 'one or more' includes a function being performed by one element, a function being performed by more than one element, e.g., in a distributed fashion, several functions being performed by one element, several functions being performed by several elements, or any combination of the above.

Moreover, it will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

The hardware used to implement the various illustrative logics, logical blocks, modules, and circuits described in connection with the aspects disclosed herein can include a general purpose processor, a digital signal processor (DSP), a special-purpose processor such as an application specific integrated circuit (ASIC) or a field programmable gate array (FPGA), a programmable logic device, discrete gate or transistor logic, discrete hardware components, or any combination thereof designed to perform the functions described herein. A general-purpose processor can be a microprocessor, but, in the alternative, the processor can be any processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration. Alternatively, or in addition, some steps or methods can be performed by circuitry that is specific to a given function.

In one or more example embodiments, the functions described herein can be implemented by special-purpose hardware or a combination of hardware programmed by firmware or other software. In implementations relying on firmware or other software, the functions can be performed as a result of execution of one or more instructions stored on one or more non-transitory computer-readable media and/or one or more non-transitory processor-readable media. These instructions can be embodied by one or more processor-executable software modules that reside on the one or more non-transitory computer-readable or processor-readable storage media. Non-transitory computer-readable or processor-readable storage media can in this regard comprise any storage media that can be accessed by a computer or a processor. By way of example but not limitation, such non-transitory computer-readable or processor-readable media can include random access memory (RAM), read-only memory (ROM), electrically erasable programmable read-only memory (EEPROM), FLASH memory, disk storage, magnetic storage devices, or the like. Disk storage, as used herein, includes compact disc (CD), laser disc, optical disc, digital versatile disc (DVD), floppy disk, and Blu-ray Disc™, or other storage devices that store data magnetically or optically with lasers. Combinations of the above types of media are also included within the scope of the terms non-transitory computer-readable and processor-readable media. Additionally, any combination of instructions stored on the one or more non-transitory processor-readable or computer-readable media can be referred to herein as a computer program product.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components can be used in conjunction with the supply management system. Therefore, it is to be understood that the inventions are not to be limited to the specific embodiments disclosed and that modifications and other embodiments are intended to be included within the scope of the appended claims. Moreover, the steps in the method described above can not necessarily occur in the order depicted in the accompanying diagrams, and in some cases one or more of the steps depicted can occur substantially simultaneously, or additional steps can be involved. Although specific terms are employed herein, they are used in a generic and descriptive sense only and not for purposes of limitation.

It is intended that the specification and examples be considered as exemplary only, with a true scope and spirit of the disclosure being indicated by the following claims.

What is claimed is:

1. A system, comprising:
one or more processors;
a memory; and
one or more programs stored in the memory, the one or more programs comprising instructions configured to:
receive an event indicator related to a change event associated with operation of an asset, wherein the event indicator is received in response to a trigger condition associated with a clusterization model for the asset, wherein the clusterization model provides grouping of asset data into clusters of data based on similarity of at least one of attributes and features associated with the asset data, and wherein the asset data is associated with the asset, wherein the trigger condition corresponds to a transition of a portion of the asset data from a first cluster to a second cluster modeled by the clusterization model; and
in response to the event indicator associated with the asset:
determine one or more insights for one or more real-time settings for the asset based at least in part on a comparison between a current operating condition digital signature for the asset and historical operating condition digital signature for the asset;
adjust the one or more real-time settings for the asset based on the one or more insights to provide one or more adjusted settings for the asset; and
perform one or more actions based on the one or more adjusted settings for the asset.

2. The system of claim 1, the one or more programs further comprising instructions configured to:
determine one or more instance-based learning insights for the one or more real-time settings based at least in part on the comparison between the current operating condition digital signature for the asset and the historical operating condition digital signature for the asset.

3. The system of claim 1, the one or more programs further comprising instructions configured to:
receive the event indicator in response to a cluster change with respect to the asset data for the asset.

4. The system of claim 1, the one or more programs further comprising instructions configured to:
generate the current operating condition digital signature for the asset by filtering current operational variables and asset context data for the asset.

5. The system of claim 4, the one or more programs further comprising instructions configured to:
filter the current operational variables and the asset context data for the asset based on at least one of one or more clustering thresholds, one or more noise thresholds, one or more accuracy metrics, a set of features included in the historical operating condition digital signature, and a set of predefined events associated with the asset.

6. The system of claim 1, the one or more programs further comprising instructions configured to:
determine non-decision variables and decision variables associated with the asset data; and
perform distinct filtering processes with respect to the asset data based on the non-decision variables and decision variables.

7. The system of claim 1, the one or more programs further comprising instructions configured to:
configure the current operating condition digital signature based on a set of candidate features for historical operating conditions.

8. The system of claim 1, the one or more programs further comprising instructions configured to:
configure the one or more adjusted settings for the asset based on one or more historical operating condition digital signatures that are determined to be most similar to the current operating condition digital signature, wherein the one or more historical operating condition digital signatures are associated with a defined type of operation throughput variable.

9. The system of claim 1, the one or more programs further comprising instructions configured to:

transmit a control signal configured based at least in part on the one or more adjusted settings for the asset to a controller configured for optimization associated with the asset.

10. A method, comprising:

at a device with one or more processors and a memory:

receiving an event indicator related to a change event associated with operation of an asset, wherein the event indicator is received in response to a trigger condition associated with a clusterization model for the asset, wherein the clusterization model provides grouping of asset data into clusters of data based on similarity of at least one of attributes and features associated with the asset data, and wherein the asset data is associated with the asset, wherein the trigger condition corresponds to a transition of a portion of the asset data from a first cluster to a second cluster modeled by the clusterization model; and in response to the event indicator associated with the asset:

determining one or more insights for one or more real-time settings for the asset based at least in part on a comparison between a current operating condition digital signature for the asset and historical operating condition digital signature for the asset;

adjusting the one or more real-time settings for the asset based on the one or more insights to provide one or more adjusted settings for the asset; and performing one or more actions based on the one or more adjusted settings for the asset.

11. The method of claim 10, the determining the one or more insights comprising determining one or more instance-based learning insights for the one or more real-time settings based at least in part on the comparison between the current operating condition digital signature for the asset and the historical operating condition digital signature for the asset.

12. The method of claim 10, the receiving the event indicator comprising receiving the event indicator in response to a cluster change with respect to the asset data for the asset.

13. The method of claim 10, further comprising:

generating the current operating condition digital signature for the asset by filtering current operational variables and asset context data for the asset.

14. The method of claim 13, wherein the filtering comprises filtering the current operational variables and the asset context data for the asset based on at least one of one or more clustering thresholds, one or more noise thresholds, one or more accuracy metrics, a set of features included in the historical operating condition digital signature, and a set of predefined events associated with the asset.

15. The method of claim 10, further comprising:

determining non-decision variables and decision variables associated with the asset data; and performing distinct filtering processes with respect to the asset data based on the non-decision variables and decision variables.

16. The method of claim 10, further comprising:

configuring the current operating condition digital signature based on a set of candidate features for historical operating conditions.

17. The method of claim 10, further comprising:

configuring the one or more adjusted settings for the asset based on one or more historical operating condition digital signatures that are determined to be most similar to the current operating condition digital signature, the one or more historical operating condition digital signatures being associated with a defined type of operation throughput variable.

18. A non-transitory computer-readable storage medium comprising one or more programs for execution by one or more processors of a device, the one or more programs including instructions which, when executed by the one or more processors, cause the device to:

receive an event indicator related to a change event associated with operation of an asset, wherein the event indicator is received in response to a trigger condition associated with a clusterization model for the asset, wherein the clusterization model provides grouping of asset data into clusters of data based on similarity of at least one of attributes and features associated with the asset data, and wherein the asset data is associated with the asset, wherein the trigger condition corresponds to a transition of a portion of the asset data from a first cluster to a second cluster modeled by the clusterization model; and in response to the event indicator associated with the asset:

determine one or more insights for one or more real-time settings for the asset based at least in part on a comparison between a current operating condition digital signature for the asset and historical operating condition digital signature for the asset;

adjust the one or more real-time settings for the asset based on the one or more insights to provide one or more adjusted settings for the asset; and perform one or more actions based on the one or more adjusted settings for the asset.

* * * * *